United States Patent [19]
Domodossola et al.

[11] Patent Number: 6,143,225
[45] Date of Patent: Nov. 7, 2000

[54] TURRET COOLING BLOCK FOR AN INDEX MACHINE

[75] Inventors: Robert Domodossola, Brampton; Ronald Ing, Etobicoke; John R Galt, Nobelton; William Jacovich, Newmarket; Steve Saggese, Bolton, all of Canada

[73] Assignee: Husky Injection Molding Systems Ltd., Canada

[21] Appl. No.: 09/261,880

[22] Filed: Mar. 3, 1999

[51] Int. Cl.$^7$ .......................... B29C 45/72; B29C 45/40
[52] U.S. Cl. .................. 264/237; 264/297.3; 264/297.8; 264/328.8; 264/328.14; 264/336; 425/547; 425/548; 425/576
[58] Field of Search .................. 264/297.2, 297.3, 264/297.8, 255, 237, 328.8, 328.14, 328.16, 334, 336; 425/576, 547, 439, 548, 574, 575, 572, 592, 556

[56] References Cited

U.S. PATENT DOCUMENTS

| | | |
|---|---|---|
| 4,729,732 | 3/1988 | Schad et al. . |
| 4,836,767 | 6/1989 | Schad et al. .............................. 264/237 |
| 5,569,476 | 10/1996 | Van Manen et al. .................... 264/334 |
| 5,728,409 | 3/1998 | Schad et al. . |
| 5,772,951 | 6/1998 | Coxhead et al. . |
| 5,837,301 | 11/1998 | Arnott et al. ......................... 264/328.8 |

*Primary Examiner*—Jill L. Heitbrink
*Attorney, Agent, or Firm*—Bachman & LaPointe, P.C.

[57] ABSTRACT

The present invention relates to a device for unloading and cooling molded parts from an injection molding machine having an index turret block rotatable about a central axis. The device comprises a cooling turret block rotatable about an axis substantially parallel to the central axis, which cooling turret block has a plurality of faces. At least one of the faces includes a plurality of nozzles for applying a cooling fluid to surfaces of the molded parts while the molded parts are resident on the index turret block. At least two of the other faces of the cooling turret block include a plurality of receiving tubes for receiving molded parts from the index turret block for further cooling. The cooling turret block of the present invention is capable of cooling multiple sets of molded parts.

62 Claims, 21 Drawing Sheets

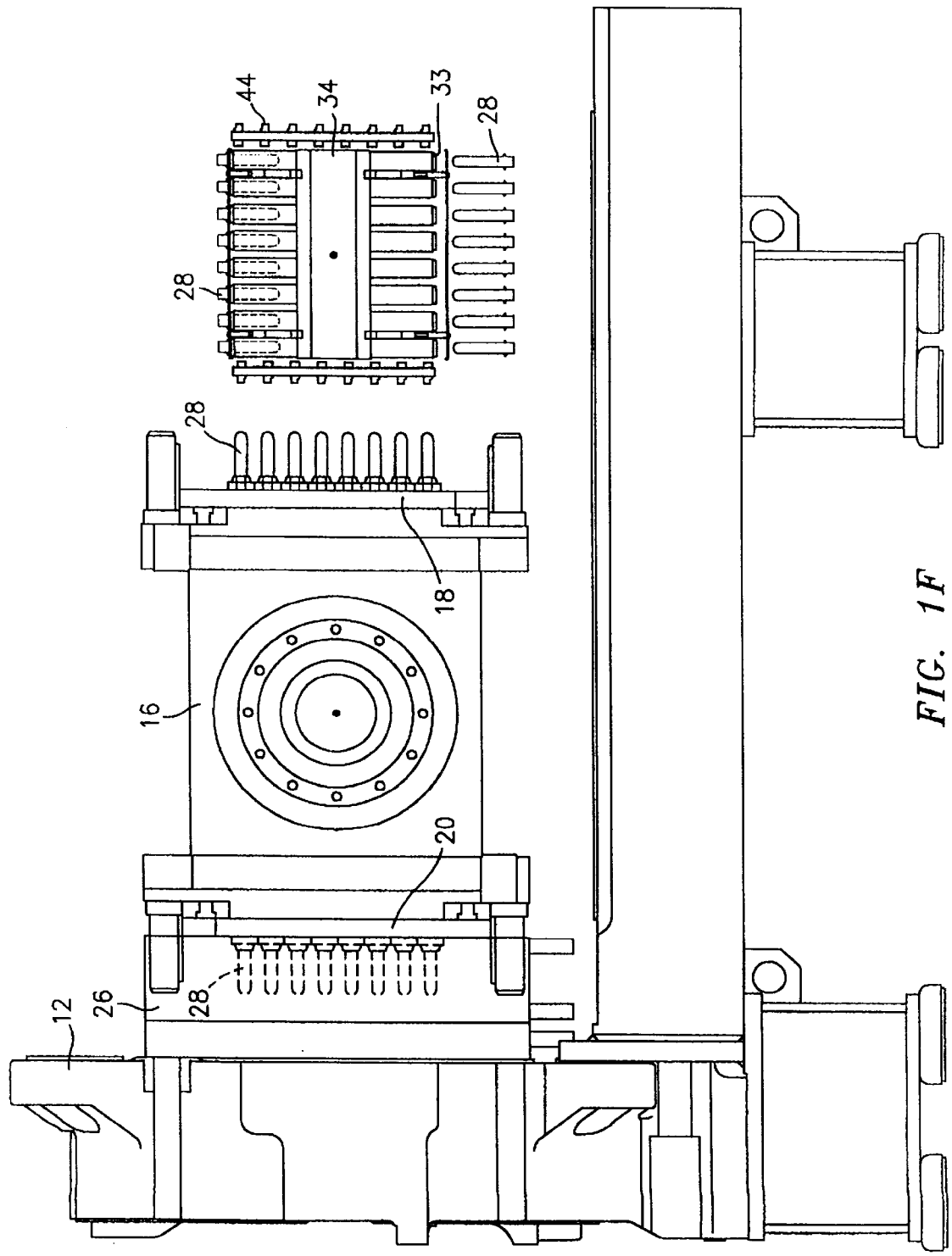

TURRET COOLING BLOCK FOR AN INDEX MACHINE

BACKGROUND OF THE INVENTION

The present invention relates to an improved turret style injection molding machine, and more particularly, to an improved turret block arrangement for unloading and cooling molded parts.

Injection molding machines having turret configurations for moving mold halves into and out of alignment with other mold halves are known in the prior art. A turret type configuration for injection molding is beneficial since it lends itself to high volume production of molded parts. This is true because different molding related operations can be performed concurrently with the actual molding of the part(s). That is, while one part is being, another part having already been molded can be subjected to post-molding operations such as post-molding cooling.

A number of different devices have been used in the prior art to unload the molded parts from the turret block. For example, U.S. Pat. No. 5,728,409 illustrates the use of a robotic type or airveyor type of article removal mechanism to unload molded parts from a turret block. The '409 patent also illustrates an approach for loading inserts onto mold cores carried by the turret block.

U.S. Pat. No. 5,772,951 illustrates an approach for linking a turret block injection molding machine with a downstream article handling and conditioning system for temperature conditioning preforms prior to them being directly fed into a reheat blow molding machine.

U.S. Pat. No. 4,836,767 illustrates a rotary cooling device that accepts freshly molded preforms for cooling in tubes mounted on a four sided carousel attached to the machine's stationary platen. The machine however is required to have a special rotary moving platen and two mold core sets. One of the disadvantages of this approach is that the clamp of the machine occupies almost double the space of a comparable clamp required to perform the injection molding of the parts.

Another approach for cooling molded parts is shown in U.S. Pat. No. 4,729,732. Here, the molded parts are cooled in tapered tubes. A vacuum assist is provided to retain the parts within the tubes.

Other unloading devices mounted to an index turret block injection molding machine are shown in co-pending U.S. patent application Ser. No. 09/167,699, filed Oct. 7, 1998, to Ronald Ing et al., entitled Cooling Device Attached to Index Machine; Ser. No. 09/215,819, filed Dec. 18, 1998, to George Kutalowski, entitled Cooling Device Attached to Index Machine; and Ser. No. 09/217,141, filed Dec. 21, 1998, to Michael T. Kozai, entitled Cooling Device Attached to Index Machine, all assigned to the assignee of the instant patent application.

There remains however a need for an efficient and compact device for extending the cooling period for molded parts.

SUMMARY OF THE INVENTION

Accordingly, it is an object of the present invention to provide a device for extending the cooling period for molded parts.

It is a further object of the present invention to provide a device as above which is capable of simultaneously cooling a plurality of sets of molded parts.

It is yet a further object of the present invention to provide a device as above which is capable of applying a cooling fluid to molded parts while they are still positioned on their mold cores.

It is still a further object of the present invention to provide a device as above which allows the operator to optimize processing times for a variety of molding cycles.

The foregoing objects are attained by the unloading and cooling device of the present invention.

In accordance with the present invention, a device for unloading and cooling molded parts from an injection molding machine having an index turret block rotatable about a central axis is provided. The device broadly comprises a cooling turret block rotatable about an axis substantially parallel to the central axis, which cooling turret block has a plurality of faces. At least one of the cooling turret block faces includes means for applying a cooling fluid to surfaces of the molded parts while the molded parts are resident on the index turret block. At least two of the other faces of the cooling turret block include means for receiving molded parts from the index turret block for further cooling.

Other details of the unloading and cooling device of the present invention are set forth in the following detailed description and the accompanying drawings wherein like reference numerals depict like elements.

BRIEF DESCRIPTION OF THE DRAWINGS

FIGS. 1A through 1J illustrate a first embodiment of a turret cooling block for an index molding machine in accordance with the present invention and its sequence of operation;

DETAILED DESCRIPTION OF THE PREFERRED EMBODIMENT(S)

Figure 1A:
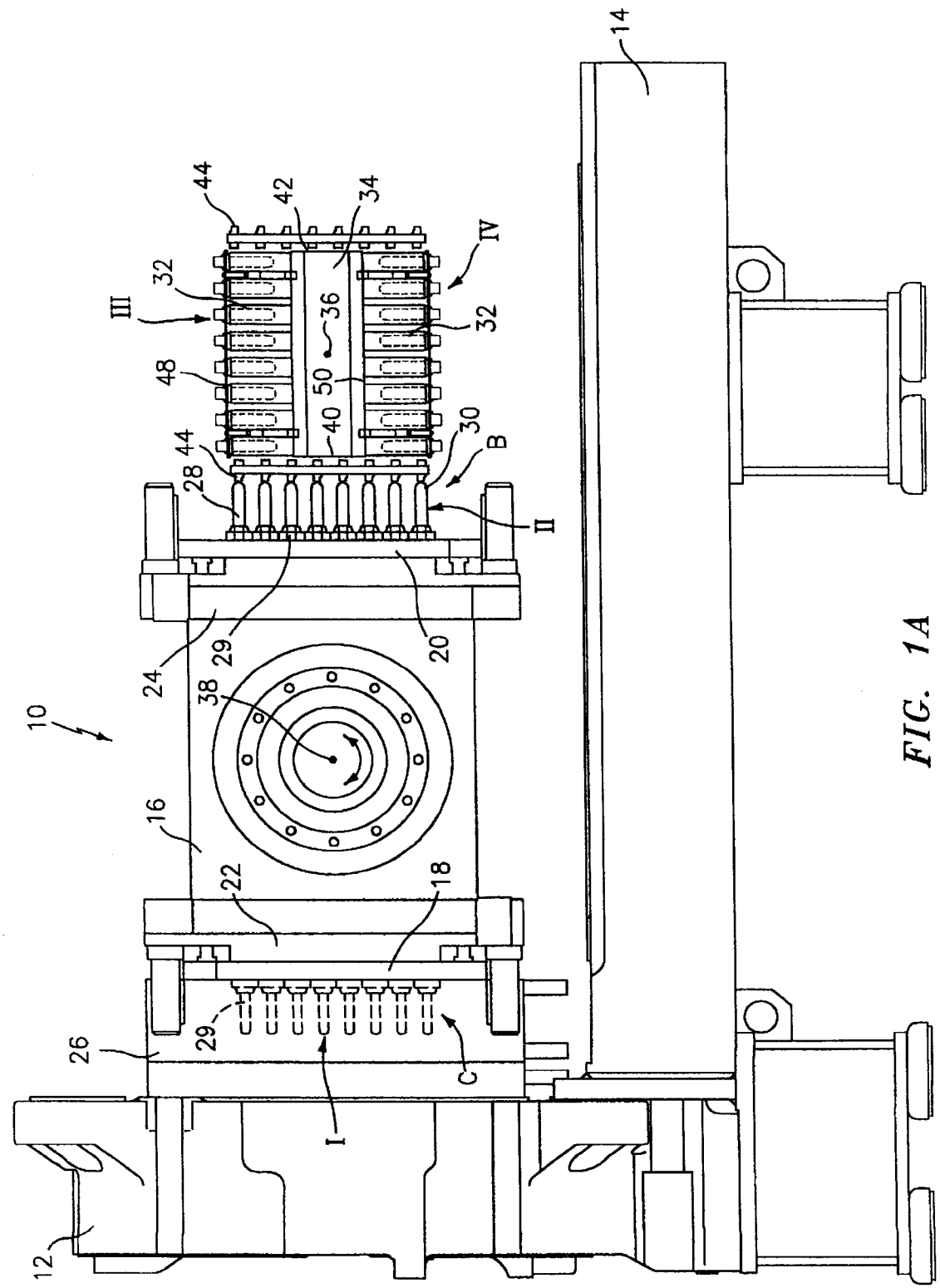

Referring now to the drawings, FIGS. 1A through 1J illustrate an injection molding machine having a cooling turret block in accordance with a first embodiment of the present invention. These figures also illustrate the sequence of operation of the turret block.

FIG. 1A shows an index clamp portion of an injection molding machine 10 such as that shown in U.S. Pat. No. 5,728,409, which patent is hereby incorporated by reference herein. The machine 10 has a stationary platen 12 which is fastened to a base 14. The machine 10 further has a rotatable index turret block 16 which is supported by two carriers (not shown) and which moves along the base 14 in a known manner. The turret block 16 rotates about a central axis 38.

The index turret block 16 carries two mold core halves 18 and 20 on two opposed faces 22 and 24. A single mold cavity half 26 is fastened to stationary platen 12 such that one of the core halves 18 and 20 can be mated with it. When the cavity half 26 is mated with one of the core halves 18 and 20, a plurality of mold cavities (not shown) are formed into which a heated molten material, such as a molten plastic resin, can be injected so as to form a number of molded parts 28 such as preforms.

After completion of the injection of the heated molten material into the mold cavities and after a predetermined cooling time has elapsed to allow the heated material to partially solidify in the cavities, the index turret block 16 is moved away from the stationary platen 12 by cylinders (not shown) so as to open the mold. The index turret block 16 is then rotated 180 degrees about the axis 38 by at least one motor (not shown) in the carriers (not shown) so as to align the other of the mold core halves 18 and 20 with the mold cavity half 26. The index turret block 16 is then moved towards the stationary platen 12 to close the mold again and begin a fresh injection sequence.

When the index turret block 16 is rotated, the freshly molded parts 28 are retained on the mold cores 29 on the first of the mold core halves 18 and 20 and are moved to a cooling and removal position B opposite to the molding position C. While on the mold cores 29, the molded parts 28 may be subjected to active or passive cooling. It has been found to be highly desirable to subject the molded parts 28 to an active cooling treatment after they have moved into the cooling and removal position B. During a first phase of this active cooling treatment, a stream of cooled fluid, typically compressed air, is directed onto the exposed gate area 30 of each of the molded parts 28. The gate area 30 is typically the hottest area while the molded parts 28 are seated on a respective one of the cooled mold core halves 18 and 20. During a second phase of the further cooling treatment, the molded parts 28 are ejected off the mold cores 29 and into a plurality of cooled tubes 32 of a cooling turret block 34. The molded parts 28 are retained in the tubes 32 with the aid of a vacuum. Any suitable conventional vacuum system (not shown) known in the art may be used to retain the molded parts within the tubes 32.

When resident in the tubes 32, the molded parts 28 are further cooled. The cooling may be active or may be passive. For example, each receiving tube 32 may be provided with a water conduction cooling system for cooling exterior surfaces of the molded parts. Alternatively, each receiving tube 32 may be provided with means for blowing a cooling fluid, such as air, about exterior surfaces of the molded parts. After a sufficient period of cooling has passed, the molded parts 28 are ejected from the tubes 32, preferably by shutting off the vacuum while the tubes 32 are in a substantially vertical orientation, and transferred to another location for storage or further treatment.

The cooling turret block 34 preferably rotates about an axis 36 which is substantially parallel to the axis 38 about which the index turret block 16 rotates. The cooling turret block 34 may have any desired number of faces. For example, as shown in FIGS. 1A through 1J, the cooling turret block 34 may have four faces. In one configuration of the cooling turret block 34, there may be two opposed faces 40 and 42 each containing means 44, such as a plurality of nozzles, for directing a cooling stream of fluid, preferably compressed air, onto the molded parts 28. As previously mentioned, the cooling fluid is preferably directed onto the gate areas 30 of the parts 28 by the plurality of nozzles 44. In a preferred nozzle arrangement, there is one nozzle 44 for each corresponding mold core 29 on the faces of the mold core halves 18 and 20.

The other faces 48 and 50 of the cooling turret block 34 preferably carry a plurality of cooling tubes 32 for receiving molded parts 28 from the cores 29 on the mold core halves 18 and 20. Each of the faces 48 and 50 preferably has one receiving tube 32 for each mold core 29 on the halves 18 and 20. The receiving tubes 32 may be mounted to a respective one of the faces 48 and 50 using any suitable means known in the art. Alternatively, if desired, the receiving tubes 32 may be embedded within the faces 48 and 50. Preferably, each receiving tube 32 is provided with suitable means, such as cooling passageways, for cooling exterior surfaces of a molded part 28 residing therein so as to further solidify the resident part 28. The molded parts 28 may be ejected from the mold cores 29 using any suitable means (not shown) known in the art including, but not limited to, ejector pins and ejector plates.

The sequence of operation for the synchronizing of motions of the index turret block 16 and the cooling turret block 34 is shown in FIGS. 1A through 1J and is described as follows. FIG. 1A shows the mold closed and a heated molten material, such as molten plastic resin, being injected into the first mold set (I).

Meanwhile, molded parts 28 from a previous injection cycle (II) are being cooled on the mold cores 29 and by a cooling stream of fluid emitted from the nozzles 44. Further, molded parts 28 from the next previous injection cycle (III) are being cooled in receiving tubes 32 on the uppermost location of the cooling turret block 34 and parts 28 from the next previous injection cycle (IV) are being cooled in the opposed set of receiving tubes 32 on the lowermost location of cooling turret block 34 in a substantially vertical orientation and are awaiting ejection onto a conveyor (not shown) beneath. Thus, at various positions in the machine 10, there are four sets of molded parts 28 being processed simultaneously.

Figure 1B:
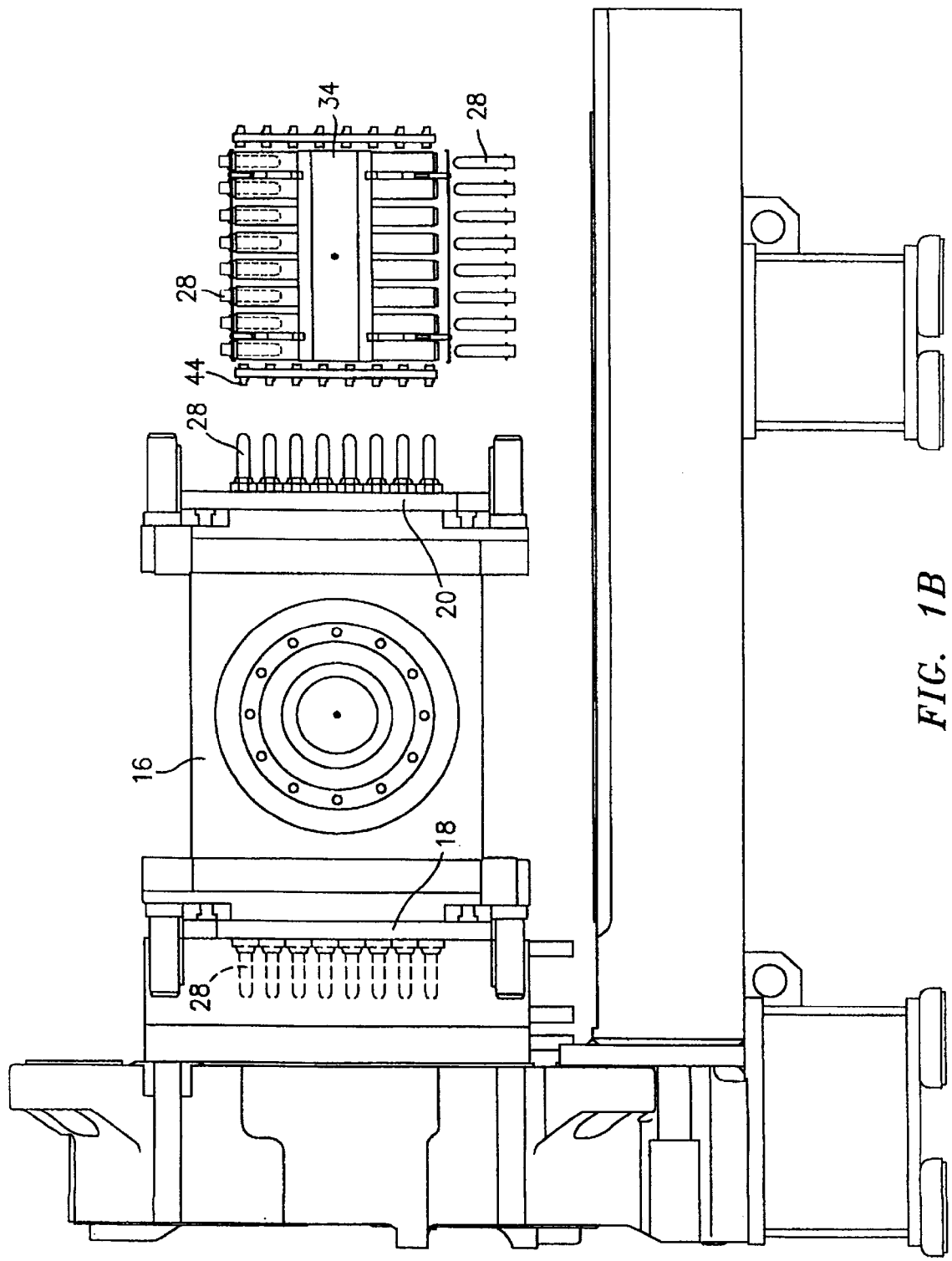

FIG. 1B shows the cooling turret block 34 being moved away from the index turret block 16. The cooling stream issued by the nozzles 44 continues to be directed onto the molded parts 28 on the mold cores 29 and the freshly molded parts 28 in the closed mold are subjected to hold pressure and cooling. The parts 28 in the uppermost receiving tubes 32 on cooling turret block 34 are cooling and the parts 28 in the lowermost tubes 32 have been ejected such as by shutting off the vacuum.

Figure 1C:
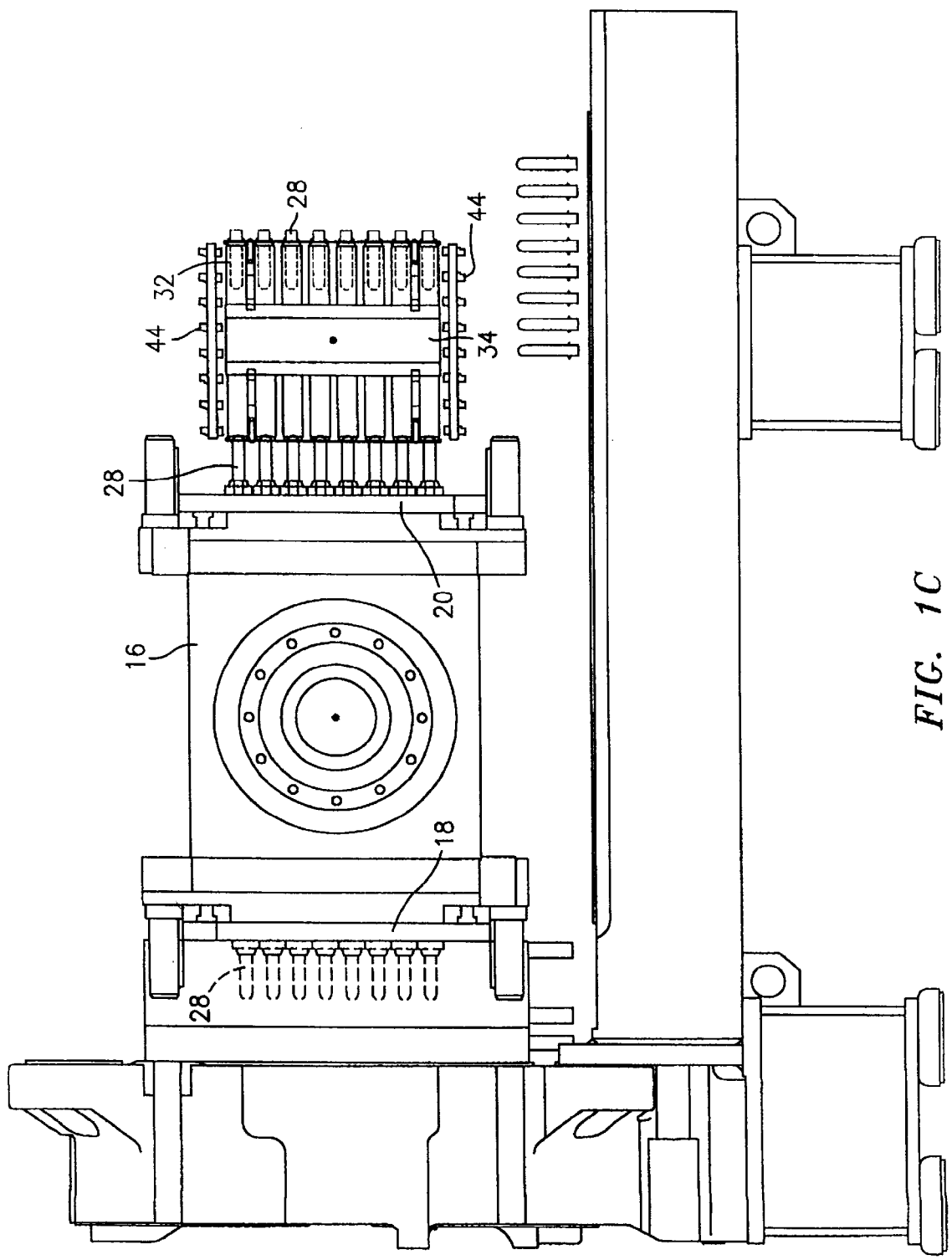

FIG. 1C shows the cooling turret block 34 rotated 90 degrees to align the now empty receiving tubes 32 (which previously formed the lowermost tubes) with the parts 28 on the mold cores 29. The mold ejector system (not shown), which as previously discussed may comprise any suitable ejection means known in the art, is operated to eject the molded parts 28 off the mold cores 29 and into the receiving tubes 32. Meanwhile the mold remains closed, hold pressure is released, and cooling continues on those parts 28 in the closed mold and those parts 28 in the receiving tubes 32 on cooling turret block 34.

Figure 1D:
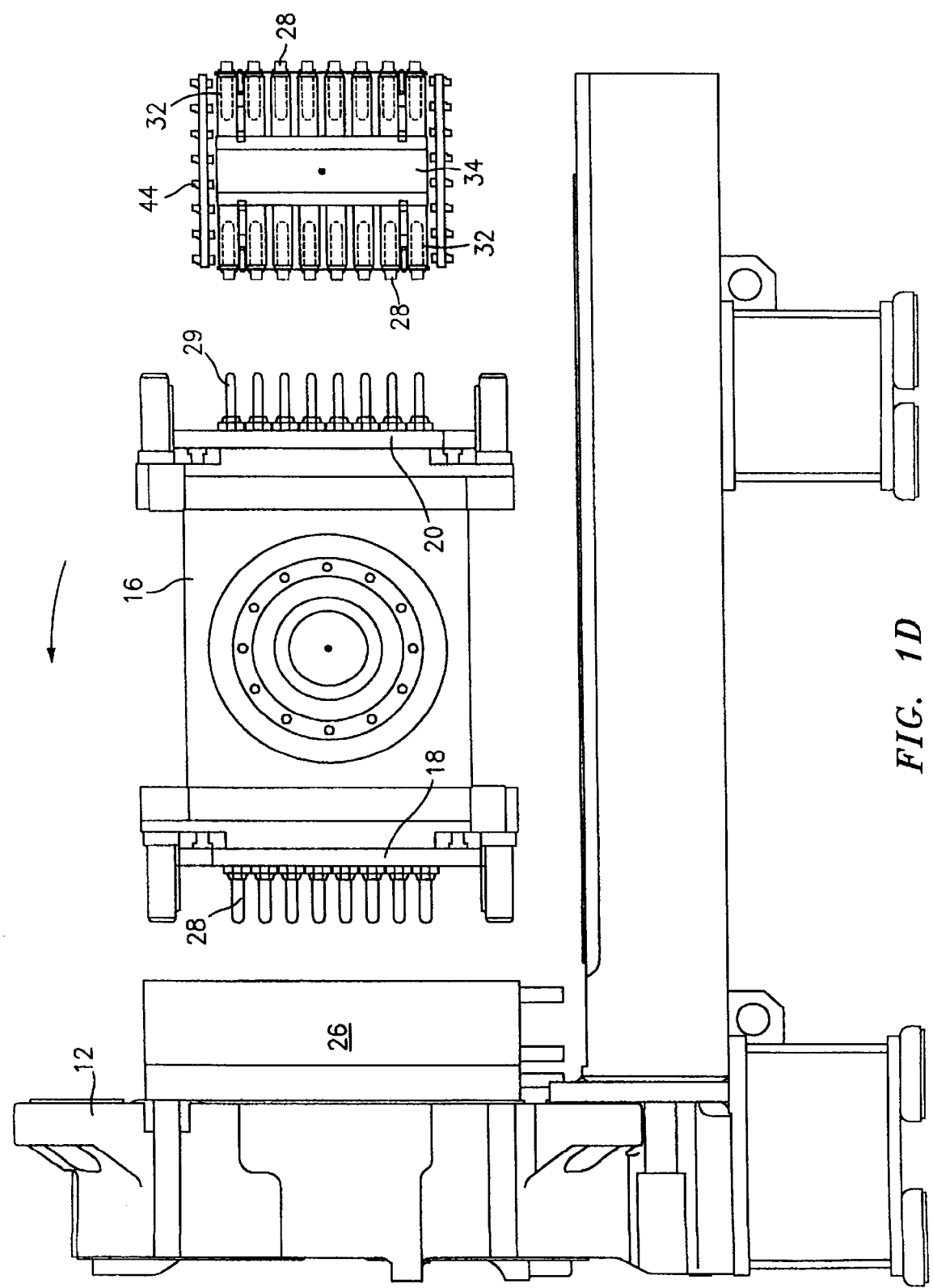

FIG. 1D shows the cooling turret block 34 spaced further away from the index turret block 16 which itself has been moved away from stationary platen 12 a distance sufficient to provide clearance for a 180 degree rotation of the index turret block 16 so as to align the second (empty) mold core half with the mold cavity half 26. Meanwhile, parts 28 on the first mold core half continue cooling and parts 28 in both sets of receiving tubes 32 on the block 34 continue cooling. Also, during this segment, cooling block 34 is rotated 90 degrees so as to bring one of the sets of nozzles 44 (typically the lower set) into cooling position.

Figure 1E:
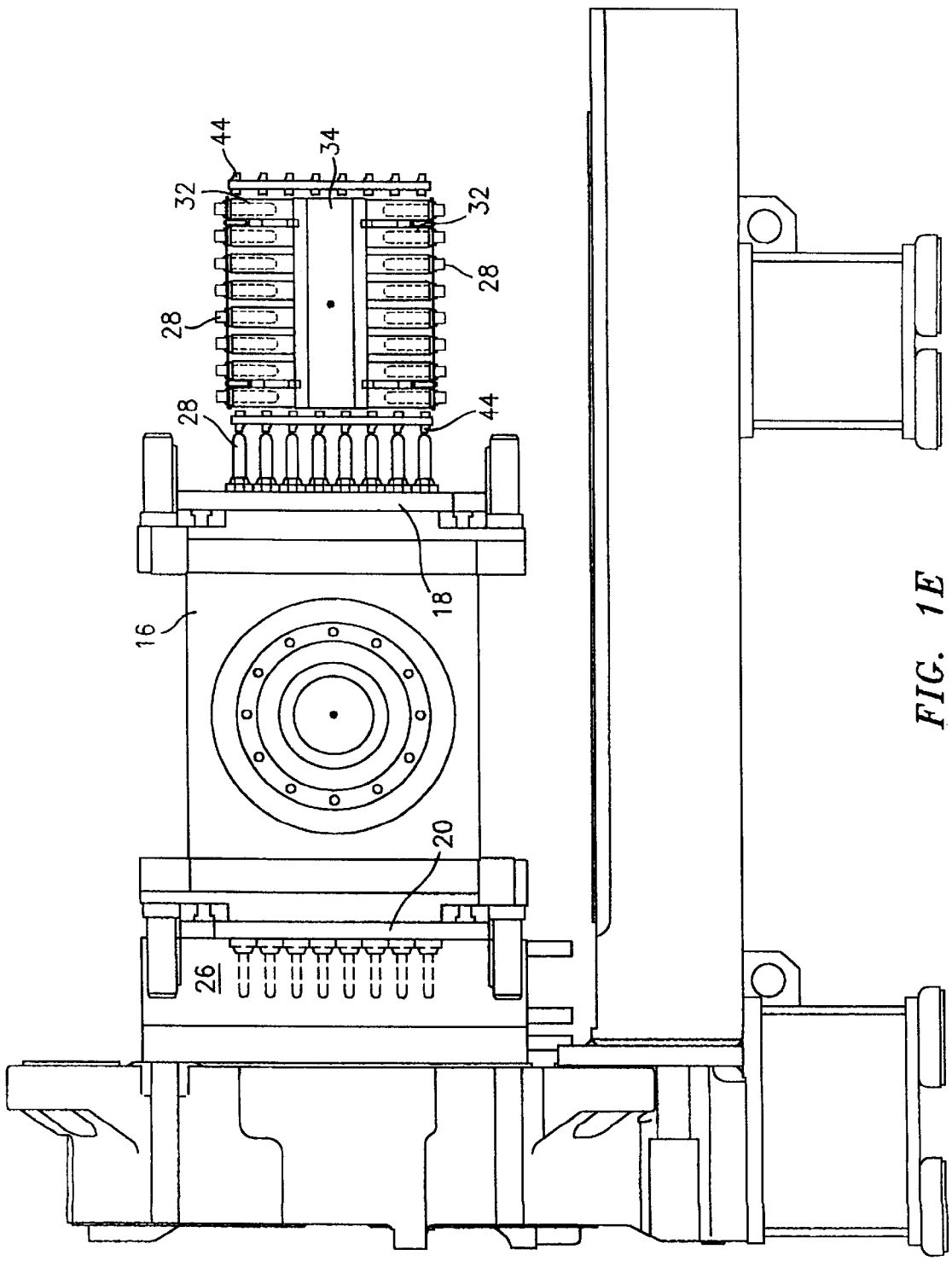
Figure 1G:
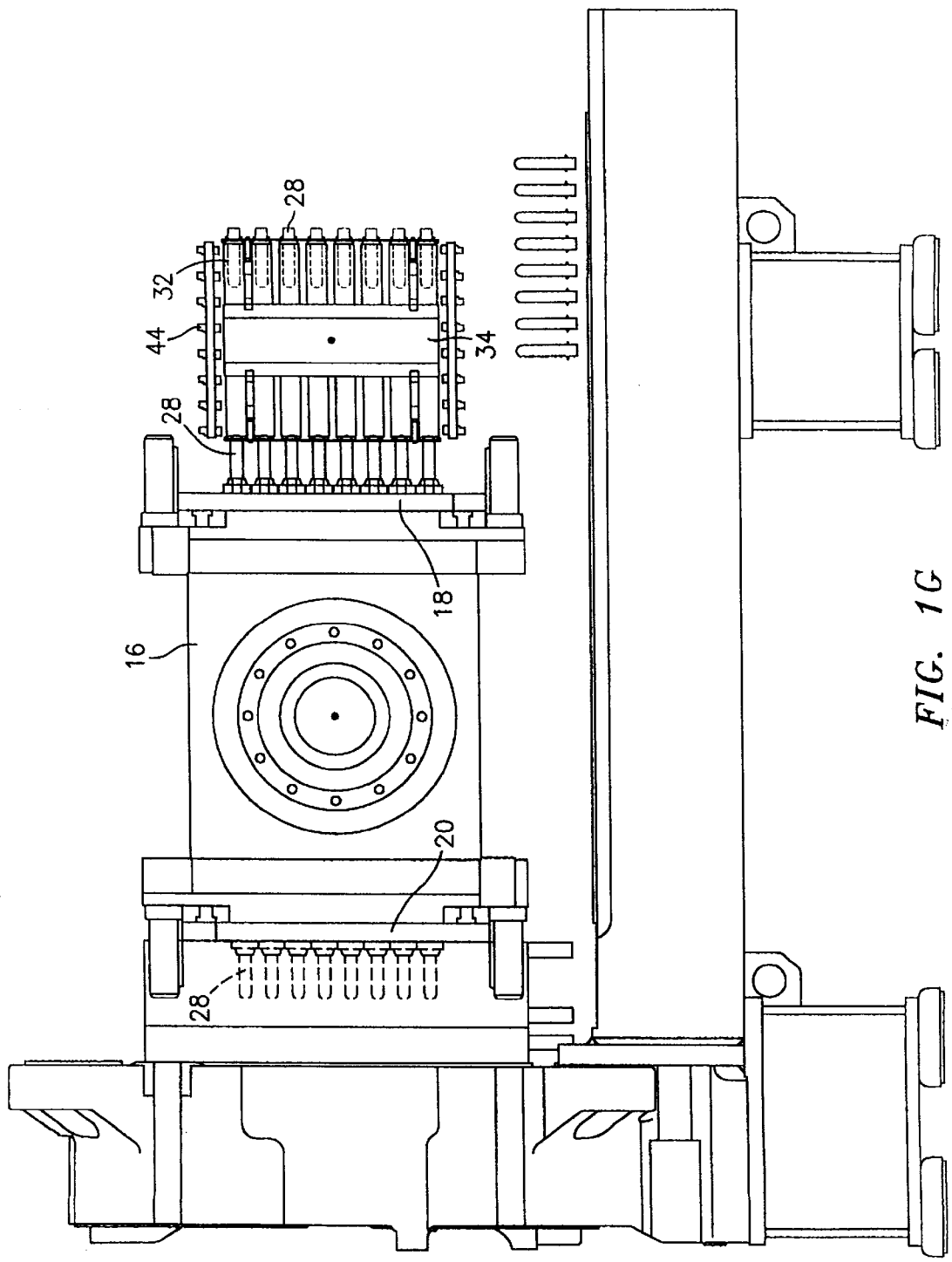
Figure 1H:
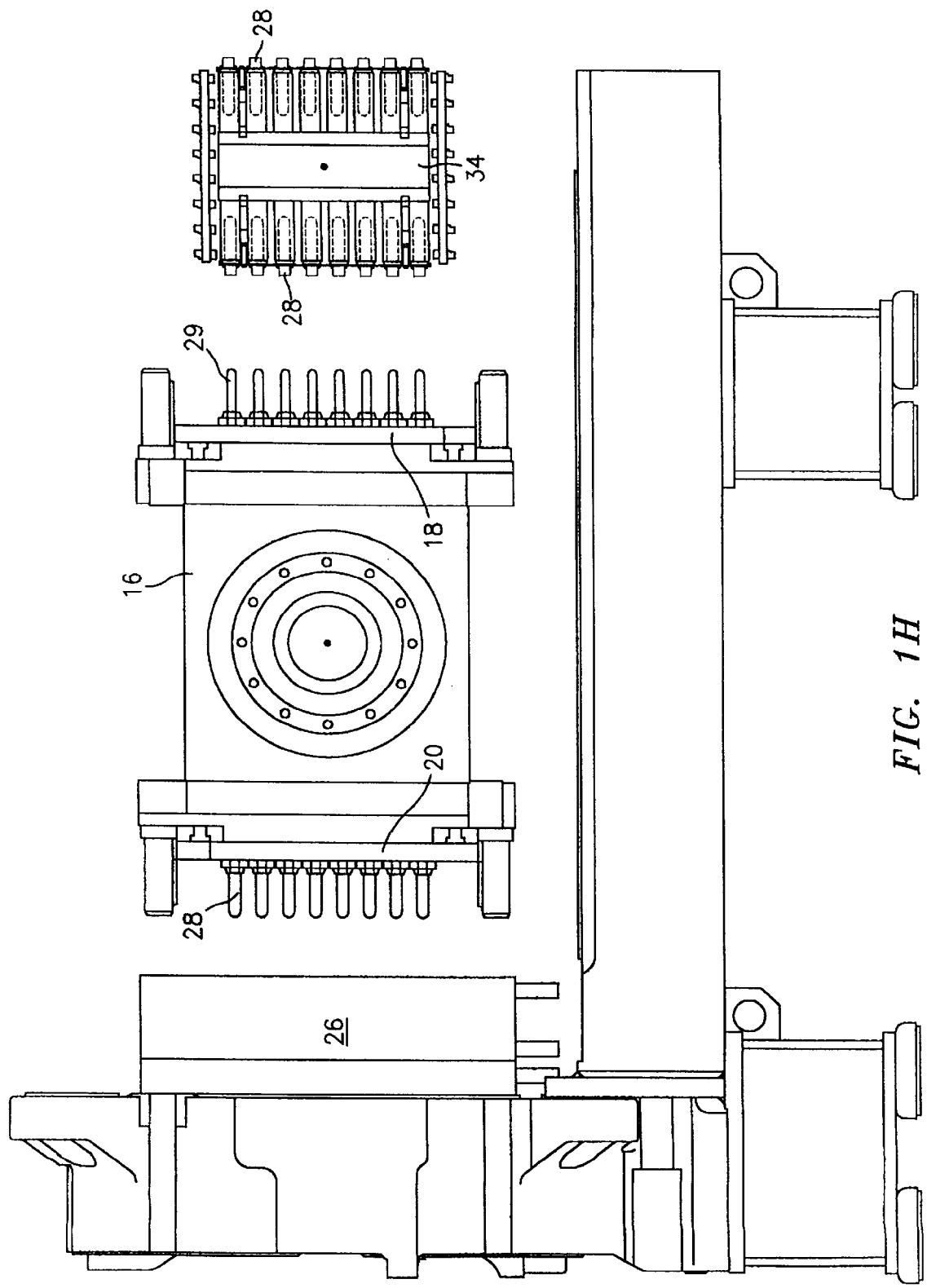
Figure 1I:
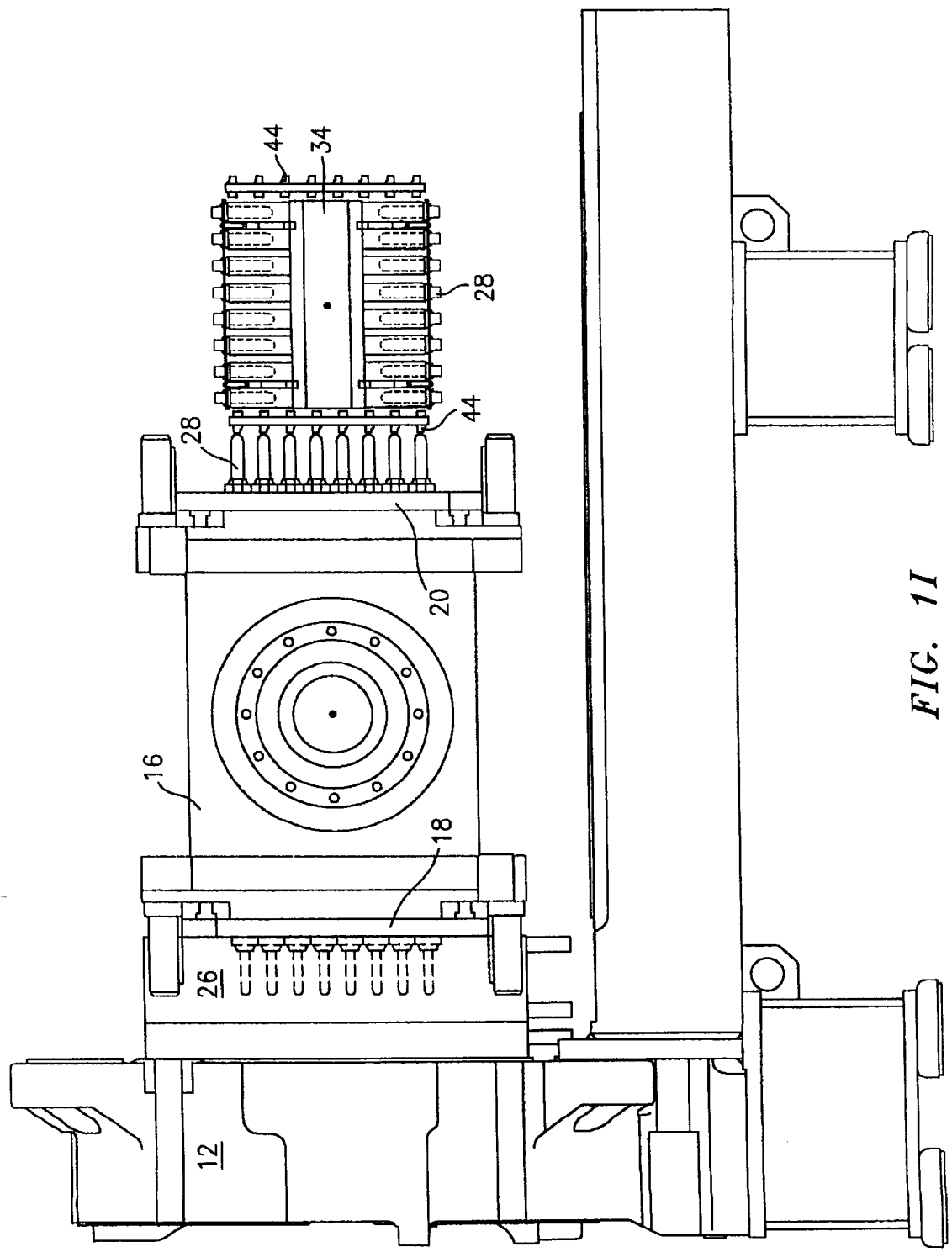
Figure 1J:
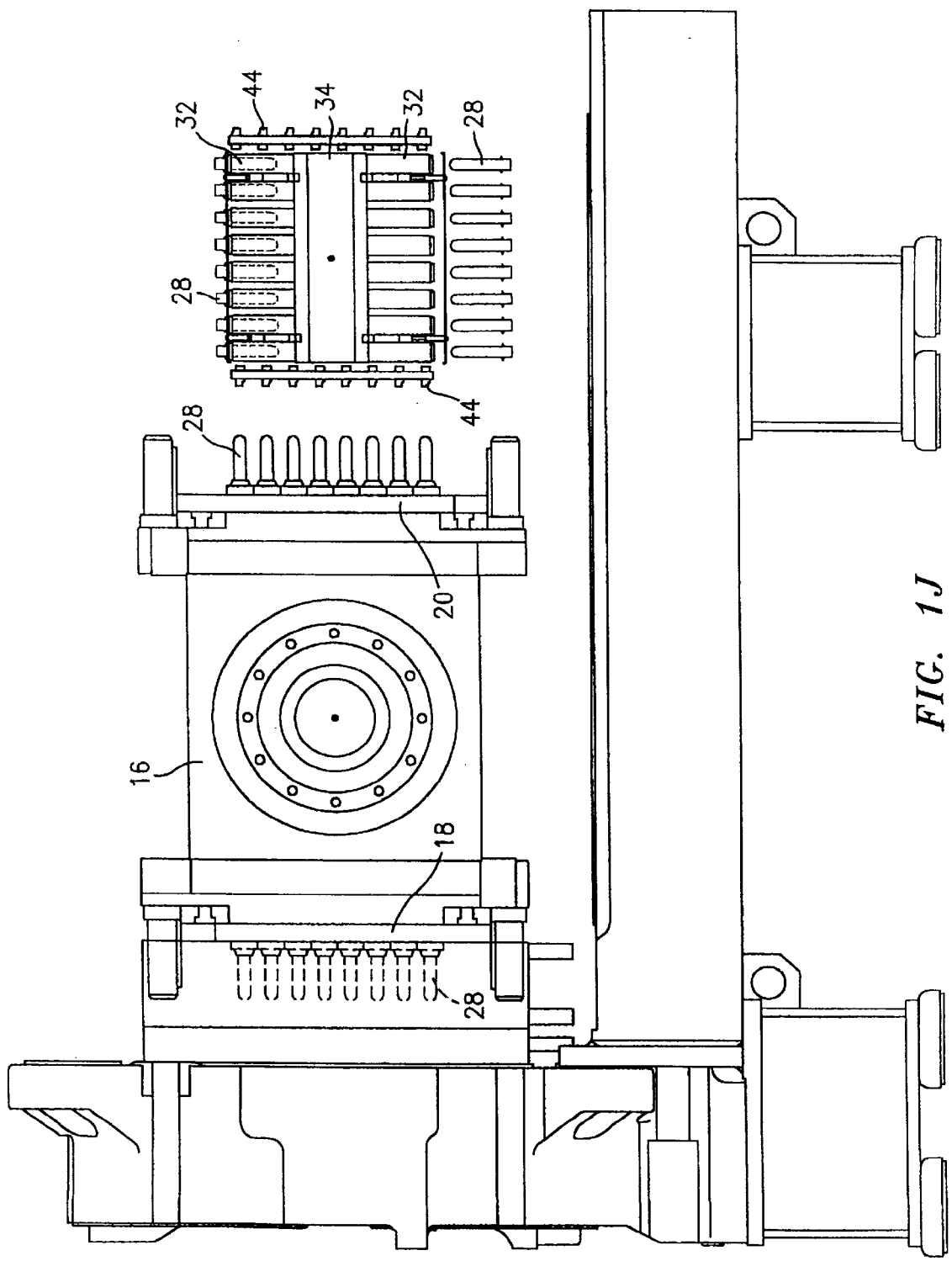

FIG. 1E shows the mold closed for injection and the cooling stream from nozzles 44 being directed on the parts 28 on the mold cores 29 as described in connection with FIG. 1A.

The sequence depicted in FIGS. 1A through 1D and described above is now repeated as shown in FIGS. 1E through 1J, thereby completing the cycle for molding two sets of parts from the single mold cavity set. It should be noted that any suitable means (not shown) known in the art may be used to rotate the cooling turret block 34 about the axis 36 in synchronization with the rotation of the index turret block 16. For example, a motor, such as the frameless electric motor disclosed in co-pending U.S. Ser. No. 09/072, 310, filed May 4, 1998, which is incorporated by reference herein, may be connected to the cooling turret block 34 by any suitable means known in the art and used to rotate same.

Figure 8:
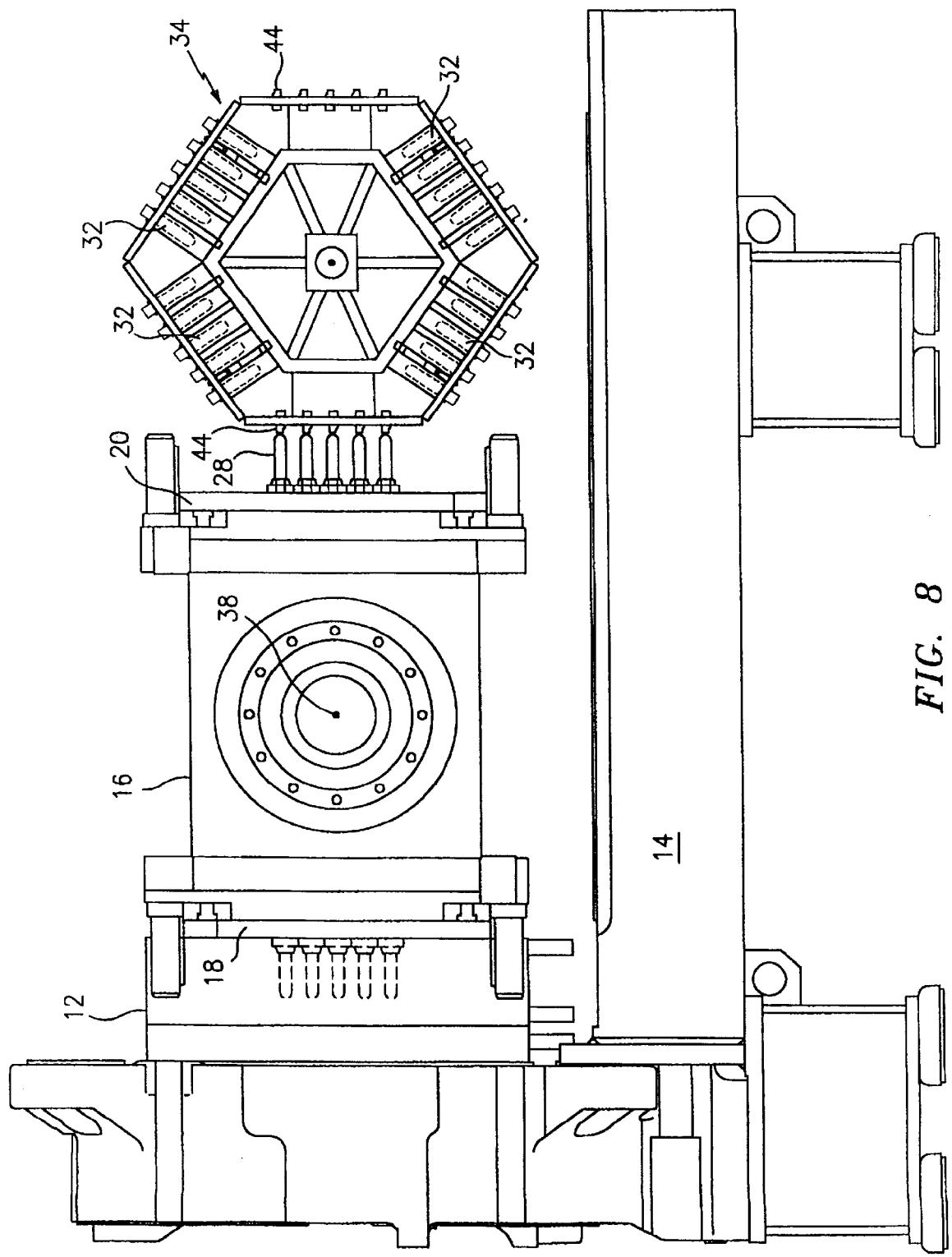
FIG. 8 illustrates an embodiment of a hexagonal cooling turret block in accordance with the present invention.

The present invention shows how an extended cooling time can be provided by providing multiple sets of blowing nozzles 44 and receiving tubes 32 on a second rotating cooling turret block 34. While the block 34 in FIGS. 1A through 1J has been illustrated as having four faces, it could in fact have any even number of faces for providing combinations of the aforementioned cooling techniques—a stream of fluid from a nozzle and/or cooled tubes to hold the parts. For example, a hexagonal shaped block 34', such as that shown in FIG. 8, could be used with one pair of opposed faces equipped with blowing nozzles 44 and two pairs of opposed faces equipped with receiving tubes 32, such that after the nozzle blowing segment, the parts are ejected into one set of vacant receiving tubes 32 by rotating the cooling turret block 34, in either direction, the required amount to align the nearest set of vacant receiving tubes with the mold cores 29. In this way, both cooling methods can be employed on all molded parts and additional receiving tube stages can be added to extend the overall cooling time for the parts before ejection. This degree of flexibility to enable the convenient addition of more cooling stages is not believed to be taught anywhere in the prior art.

This additional cooling capacity may be required when thick parts are being molded, or when laminated parts have been made by overmolding an inserted liner (not shown) placed on the mold core(s). In cases like these, additional time may be needed to allow the removal of heat from the parts, due to their extra thickness or because the thermal insulating property of the inserted liner may slow the transfer of heat to the cooled mold cores.

While the cooling turret block 34 having four faces has been described as having cooling fluid directing means or nozzles 44 on two surfaces 40 and 42 and receiving tubes 32 on two faces 48 and 50, it is possible to use a cooling turret block 34 having receiving tubes 32 on three of its four faces and means 44 for directing a cooling fluid onto the molded parts on the remaining face.

FIGS. 2A through 2E show an alternative embodiment of an index molding machine 10 having a cooling turret block 34 in accordance with the present invention. In this embodiment, the cooling turret block 34 is mounted to and carried by the carriers 54 which support the index turret block 16 for rotation.

Figure 2A:
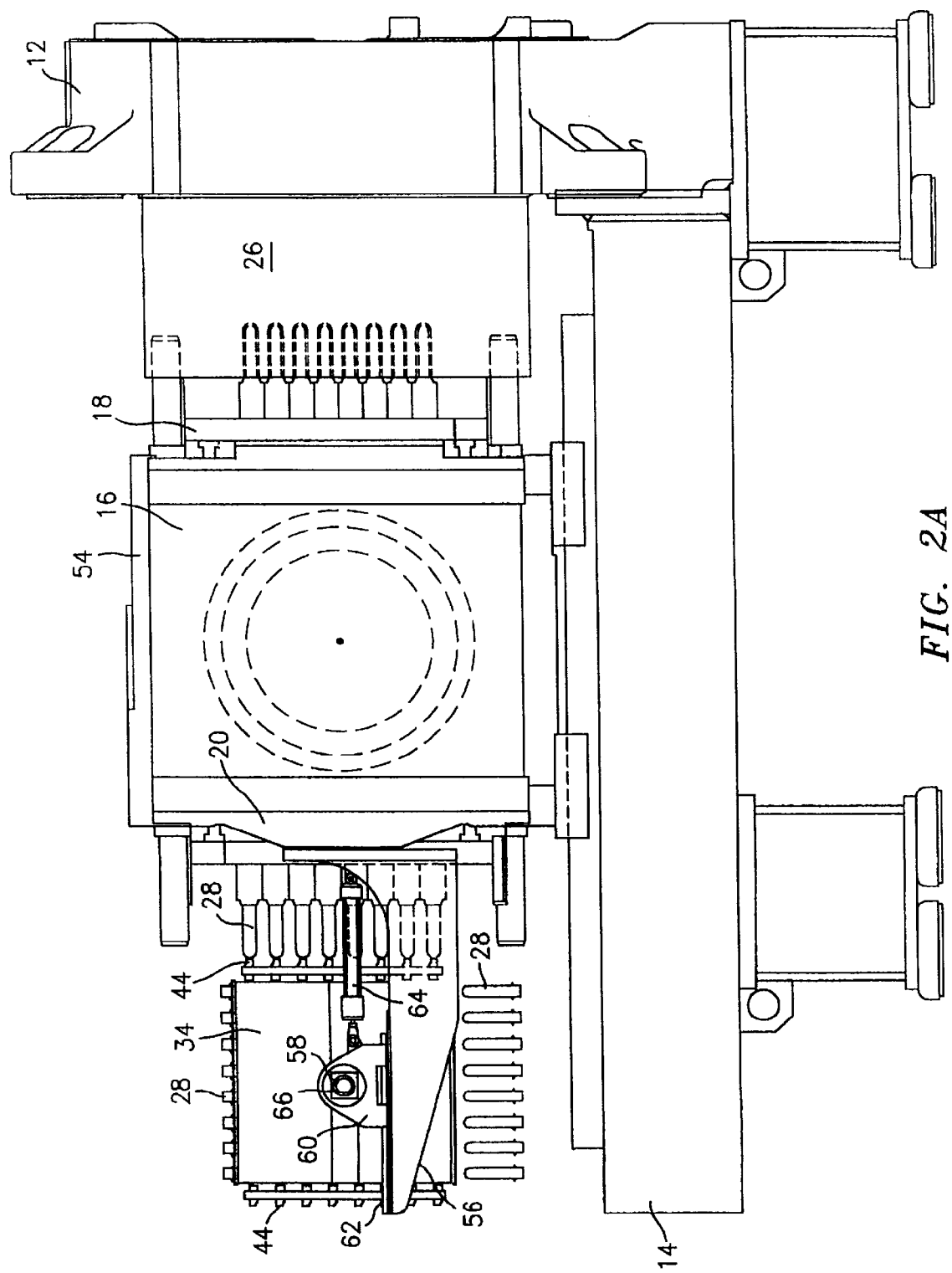
FIGS. 2A through 2E illustrate a machine having an alternative embodiment of a turret cooling block in accordance with the present invention.

FIG. 2A shows the stationary platen 12 fixed to the base 14 on which index turret block 16 slides in a known manner between mold open and mold closed positions. The index turret block 16 is supported by carriers 54, one on each side. The carriers 54 are moved toward and away from stationary platen 12 by cylinders (not shown). As before, the turret block 34 has two sets of receiving tubes 32 on opposed surfaces and two sets of nozzles 44 for blowing a cooling fluid onto the molded parts 28.

Supports 56, one on each side, are attached to the carriers 54 for support cooling turret block 34 for rotation. Turret block 34 is provided with journals 58, one on each side. The journals 58 each cooperate with a sliding block 60 that slide in a guide 62 mounted to the supports 56. A cylinder 64 is attached to each sliding block 60. The cylinders 64 cause the sliding blocks 60 to move toward and away from the index block 16 and thereby cause cooling turret block 34 to move toward and away from the index turret block 16. A servo motor 66 is attached to each journal 58 to cause the cooling turret block 34 to rotate about its axis 38. An alternate rotary drive means such as a frameless electric servo motor or a hydraulic rotary actuator, etc. could also be used.

FIGS. 2A–2E illustrate the sequence of operation of this embodiment. As before, the index block 16 is moved towards the stationary platen 26 so as to bring one of the mold halves 18 and 20 into contact with the mold cavity half 26. Molten material is then injected into the cavity spaces formed by the mated mold cores 29 and mold cavities so as to form a plurality of molded parts 28. Meanwhile, the turret block 34 is positioned so that nozzles 44 are directing a cooling fluid onto a set of molded parts 28 resident on mold cores 29, another set of molded parts is resident in an uppermost set of receiving tubes 32, and a third set of molded parts 28 is being ejected.

Figure 2B:
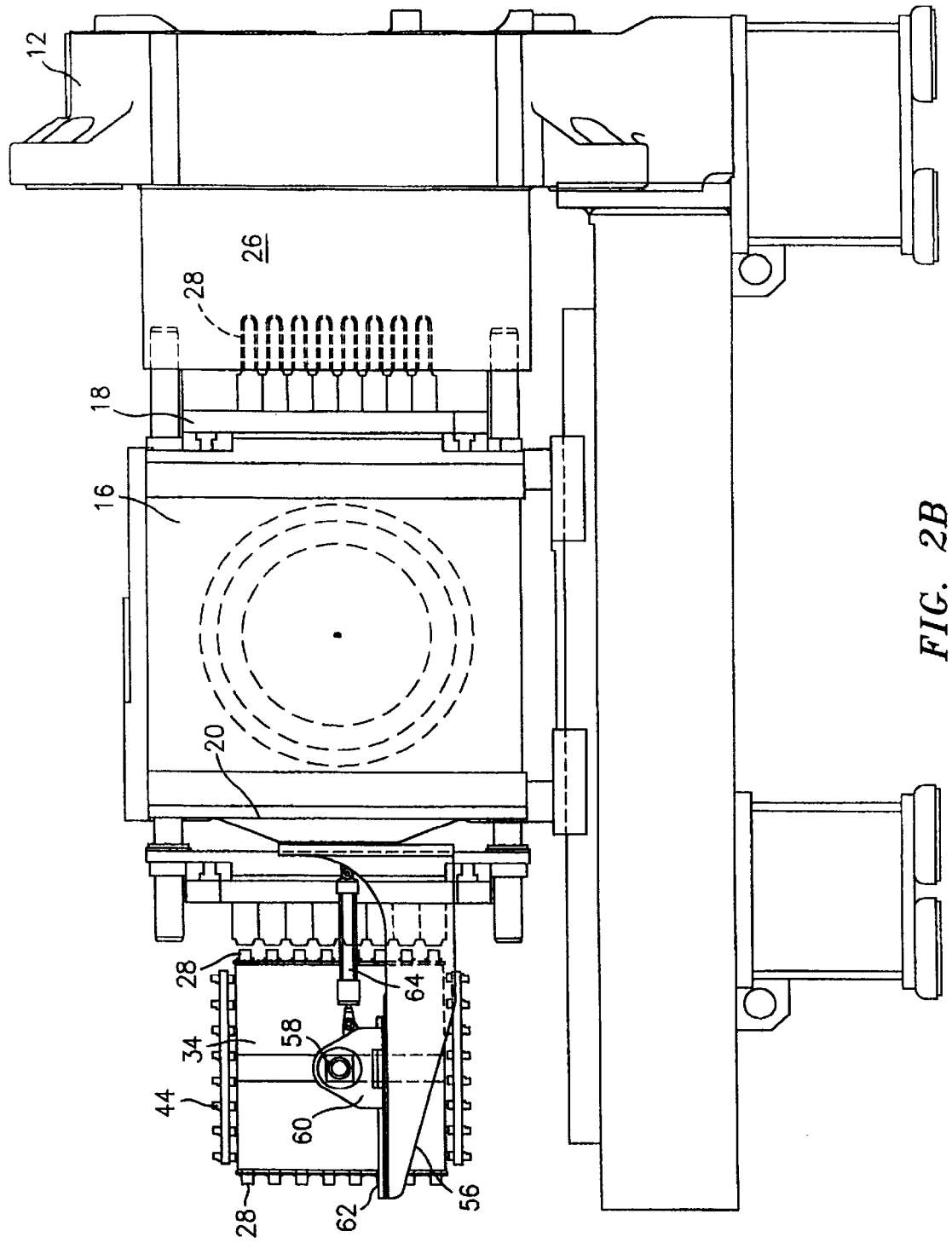

As shown in FIG. 2B, the newly formed molded parts 28 are being cooled while the mold is in a closed position. Meanwhile, the cooling turret block 34 has been rotated 90 degrees to bring an empty set of receiving tubes 32 into a part receiving position where the molded parts 28 on the mold cores 29 can be ejected into the tubes 32.

Figure 2C:
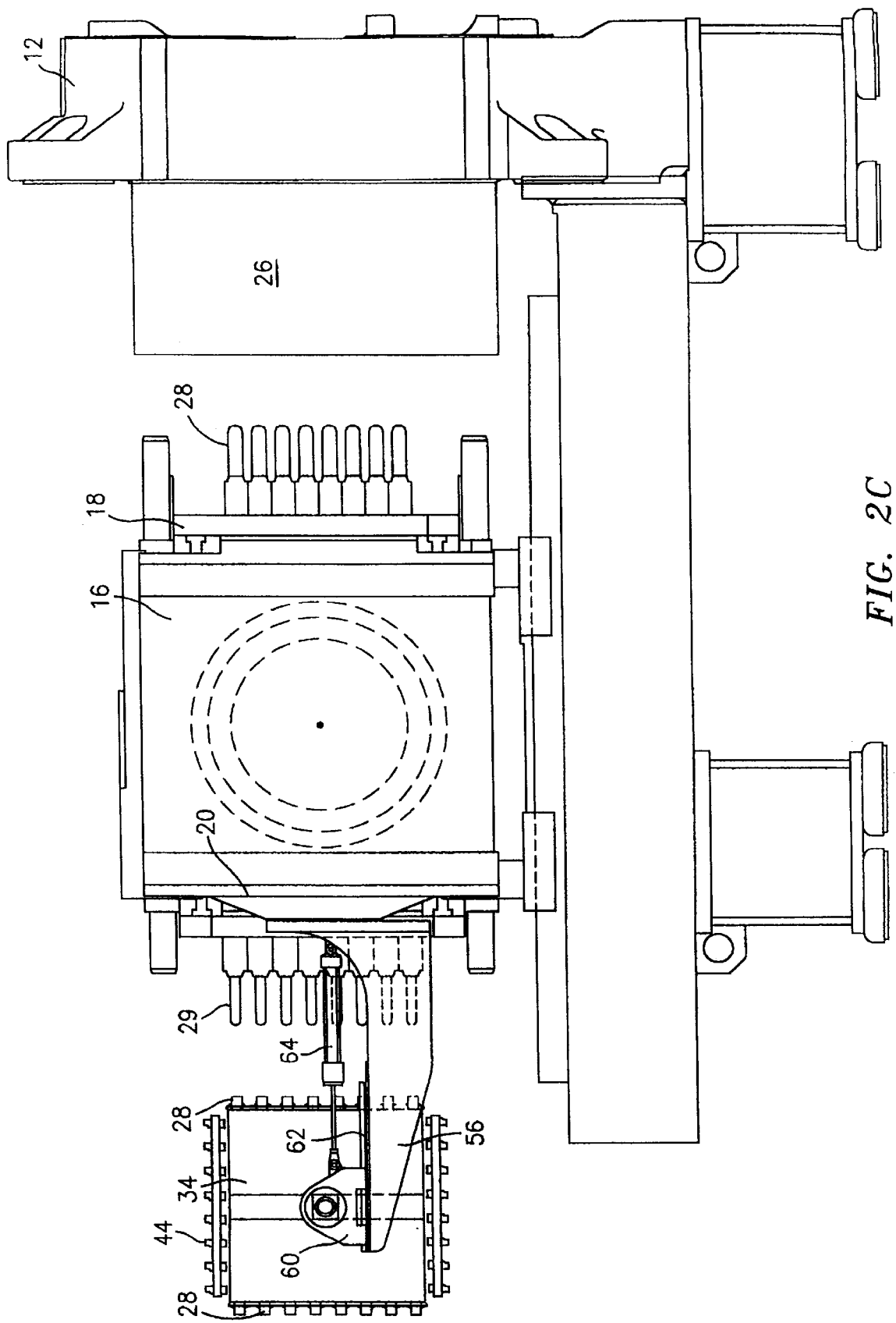
Figure 2D:
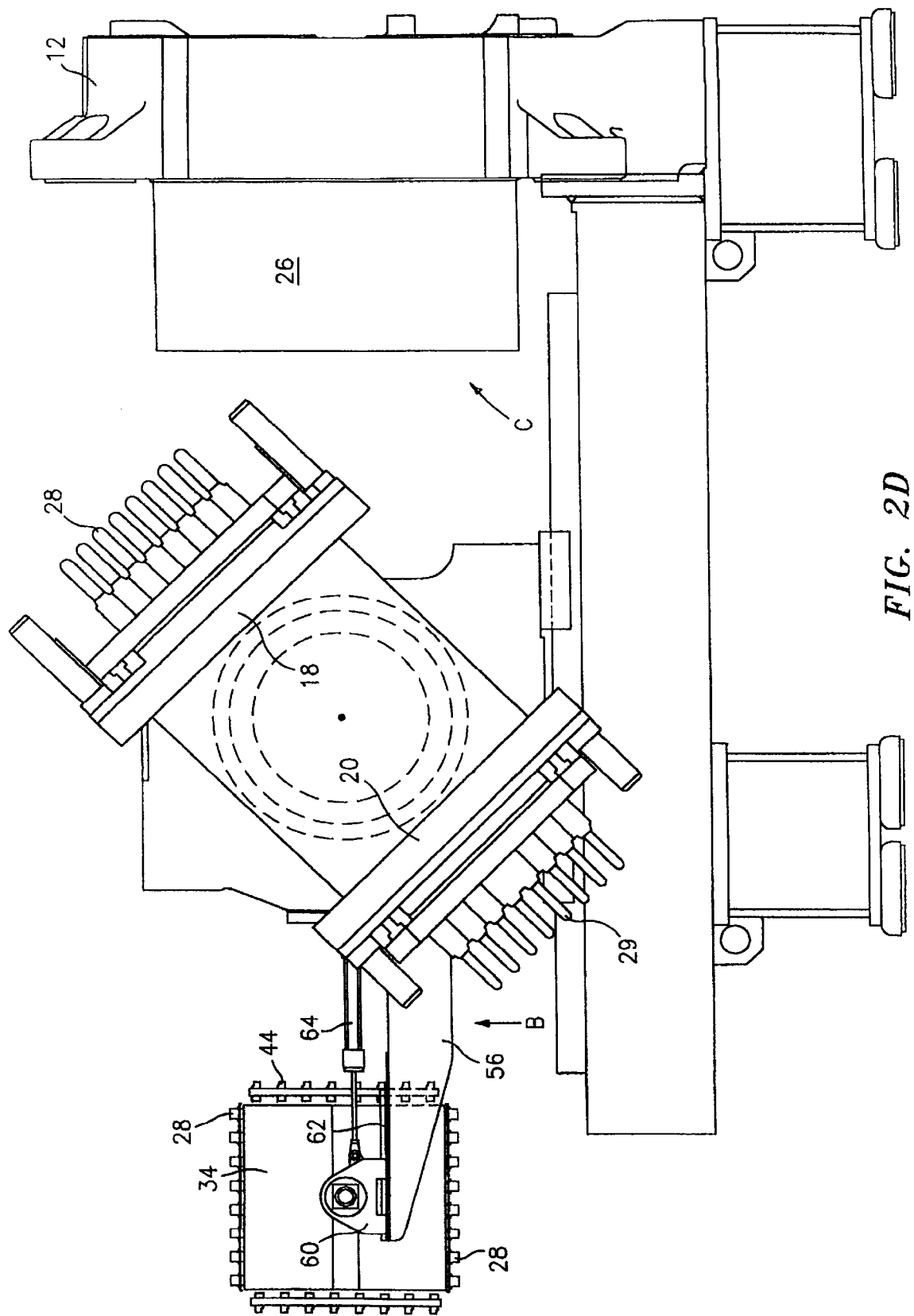

Referring now to FIG. 2C, it can be seen that the index turret block 16 has been moved away from the stationary platen 12 and the mold cavity half 26. Further, the cooling turret block 34 has been moved relative to the index turret block 16. Movement of the turret block 34 has been effected by extending cylinder 64 so as to cause the sliding block 60 to move along the guide 62. The distance between the turret block 16 and the turret block 34 is sufficient so as to allow the index turret block 16 to rotate about its central axis as shown in FIG. 2D. This brings the freshly molded parts 28 on the mold cores 29 to the cooling and unloading position B and the empty mold core pins 29 to the molding position C. Contemporaneously with the rotation of the index block 16, the turret block 34 may be rotated by motor 66 about its axis 38 so as to bring one of the cooling fluid nozzles 44 into a cooling position.

Figure 2E:
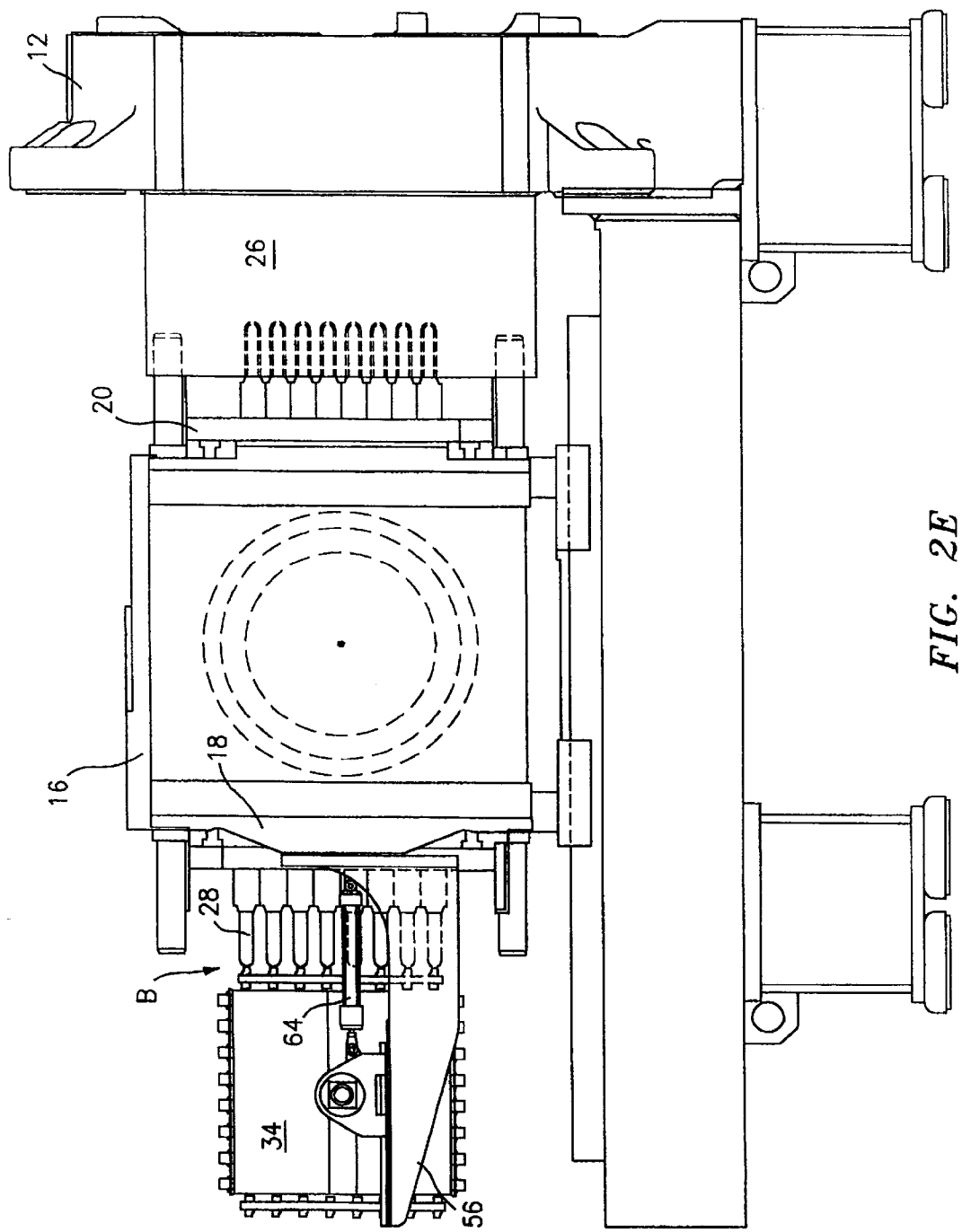

In FIG. 2E, the index turret block 16 has been moved toward the stationary platen 12 to commence another molding cycle. In addition, the turret block 34 has been moved towards the index block 16 by retracting the cylinder 64 so as to bring the nozzles 44 into a position where they can blow a cooling fluid onto the molded parts 28 in the position B.

One of the advantages of this second embodiment is that the cooling turret block 34 travels with the index turret block 16 when it is moved with respect to stationary platen 12. Consequently, simple point to point short stroke cylinders 64 are required for providing the relative motion between the cooling turret block 34 and the index turret block 16. One disadvantage to this approach however is that the cylinders (not shown) used to move the index turret block 16 relative to the stationary platen 12 must be increased in size to move the increased weight of blocks 16 and 34 and their payloads if the same motion speeds are to be maintained. Also the access between the cooling turret block 34 and index turret block 16 for servicing the mold cores 29 and the cooling devices 44 is limited to the maximum stroke provided by the cylinders 64. Thus tool changing or cleaning is less convenient for the operator.

Figure 3:
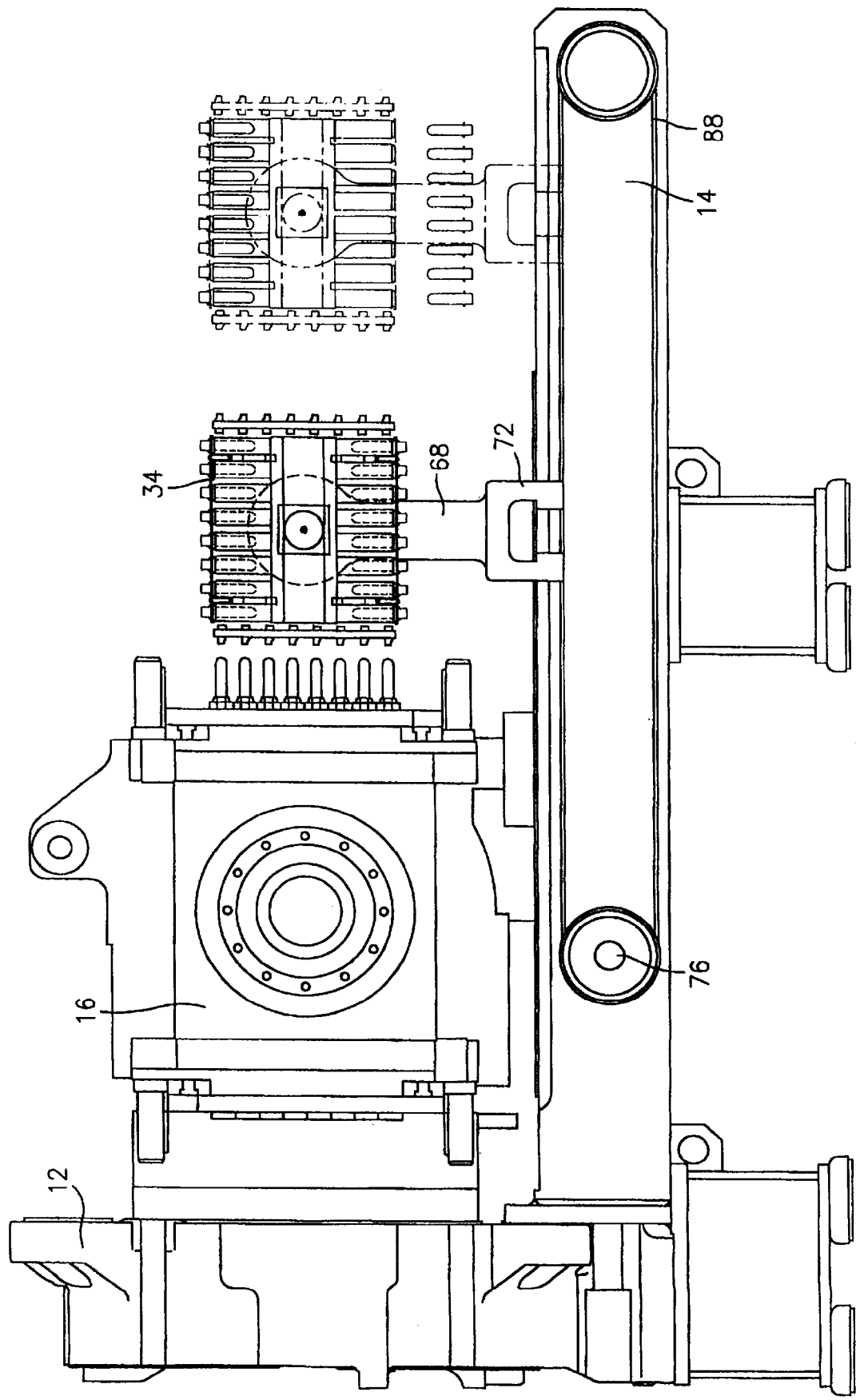
FIG. 3 is a side view of a preferred embodiment of a turret cooling block in accordance with the present invention.
Figure 4:
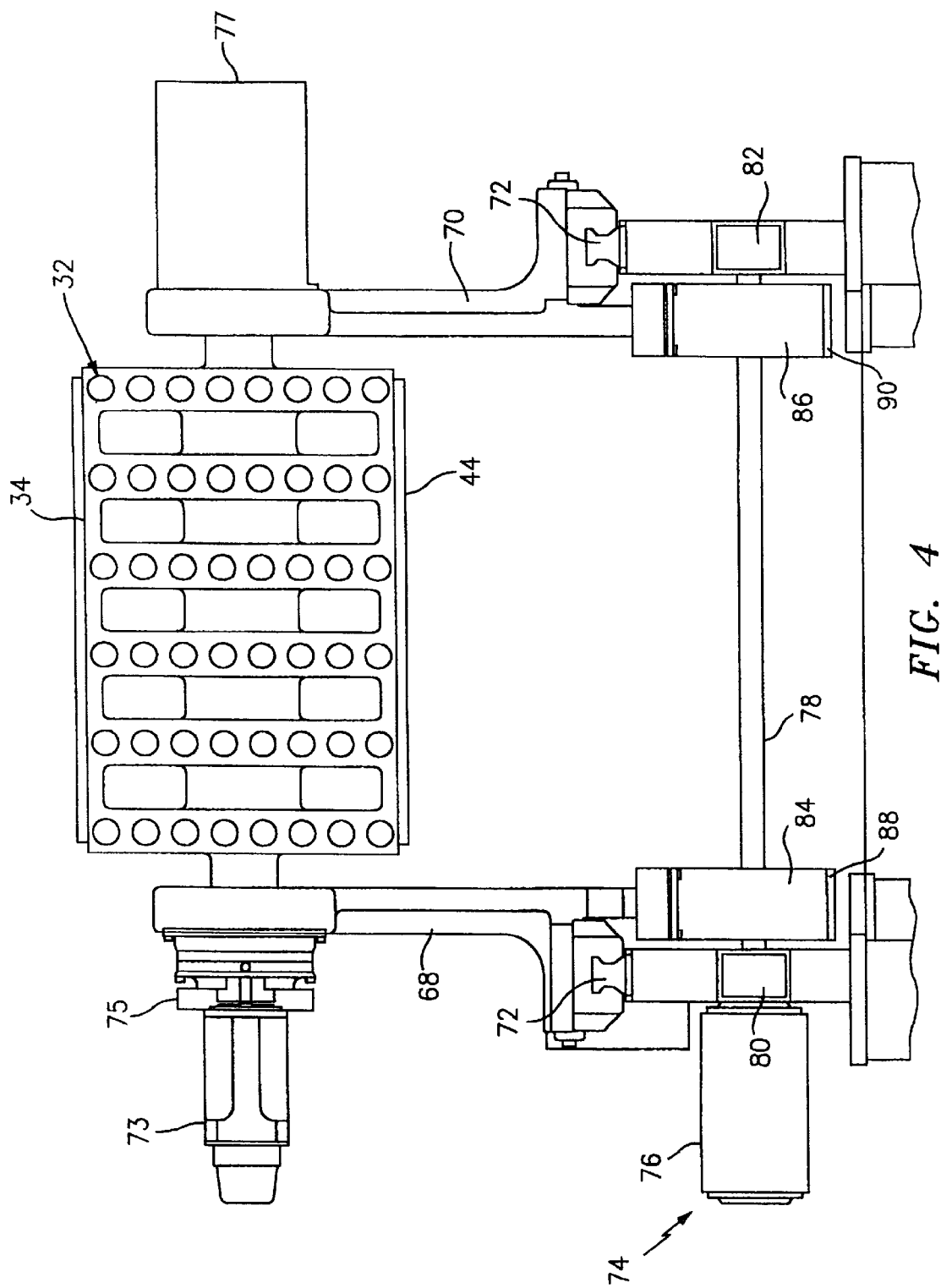
FIG. 4 is an end view of the embodiment of FIG. 3.

FIGS. 3 and 4 illustrate a preferred embodiment of an index molding machine having a cooling turret block in accordance with the present invention. In this embodiment, the cooling turret block 34 is mounted on its own set of carriers 68 and 70 which respectively slide on bearings 72 mounted to the base 14. Carriers 68 and 70 are attached to a belt drive system 74 mounted to the machine base 14 that causes the cooling turret block 34 to move toward and away from the stationary platen 12 and synchronize the motions of the cooling turret block 34 to those of the index turret block 16. The drive system 74 comprises a motor 76 driving a shaft 78 supported by bearings 80 and 82 mounted to base 14. Pulleys 84 and 86 are mounted on drive shaft belts 88 and 90 which are fastened to the feet of carriers 68 and 70. Any suitable conventional means known in the art may be used to fasten the belts 88 and 90 to the carriers 68 and 70. Tension in the belts 88 and 90 may be maintained by any suitable means (not shown) known in the art.

As shown in FIG. 4, a motor 73 is provided to rotate the cooling turret block 34 about its axis 38. The motor 73 is connected to the turret block 34 via a gearbox 75. The motor 73 and the gearbox 75 may be mounted to the carrier 68 by any suitable means (not shown) known in the art. Motor 73 could also be a frameless electric servo motor or a hydraulic rotary actuator. A rotary manifold 77 for providing service to the cooling turret block 34 may be mounted to the other carrier 70 also by any suitable means (not shown) known in the art.

The advantage of this embodiment is that the distance between the cooling turret block 34 and the index turret block 16 can be maximized to provide good access for maintenance. Also, variations in the relative motions between the cooling turret block 34 and the index turret block 16 during processing are more readily effected in order to optimize processing times for a variety of molding cycles where different plastic resins and parts being molded may cause processing conditions to be changed.

It should be noted that the motor 76 and the shaft 78 for the belt drive system is positioned on the base 14 underneath the index turret block 16 when the block 16 is in the mold closed position. This is to ensure that the shaft 78 does not block any part of the space underneath either block 16 or 34, so that there is clear space for ejection of the parts from either block 16 or 34 directly beneath it when the index turret block 16 is in the mold open position and when cooling turret block 34 is in any position.

Figure 5:
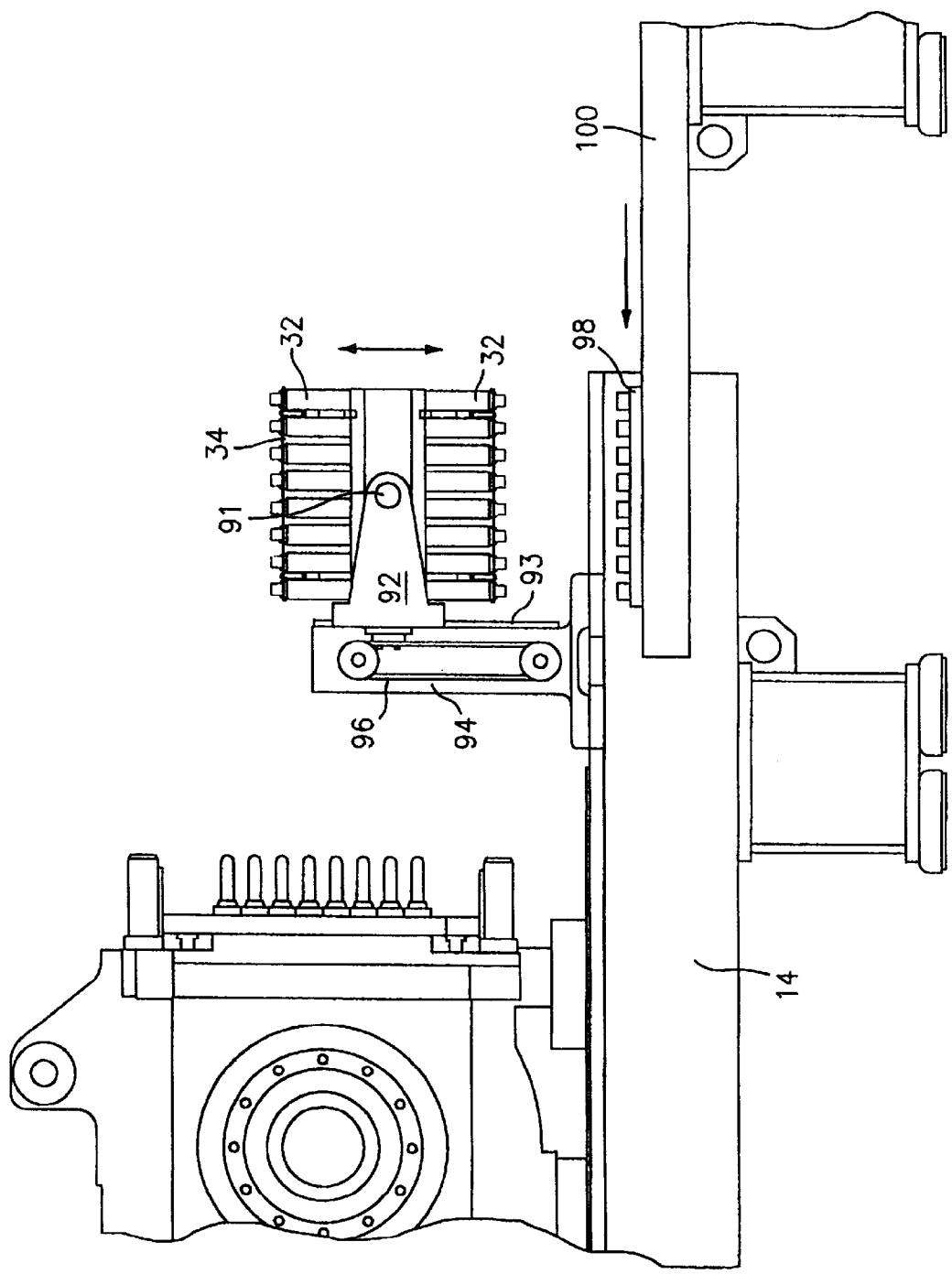
FIGS. 5–7 illustrate yet another alternative embodiment of a turret cooling block and its sequence of operation.
Figure 6:
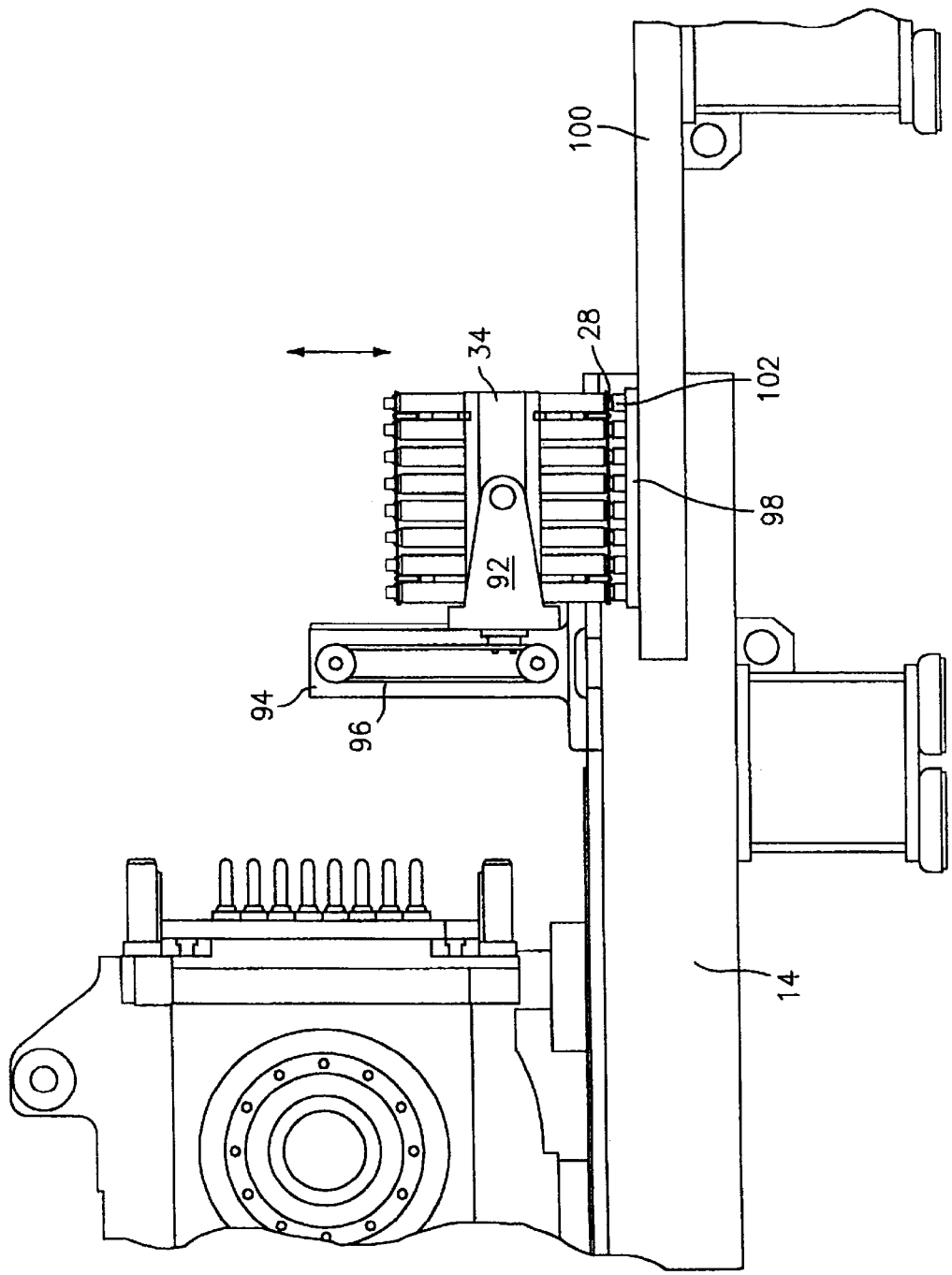
Figure 7:
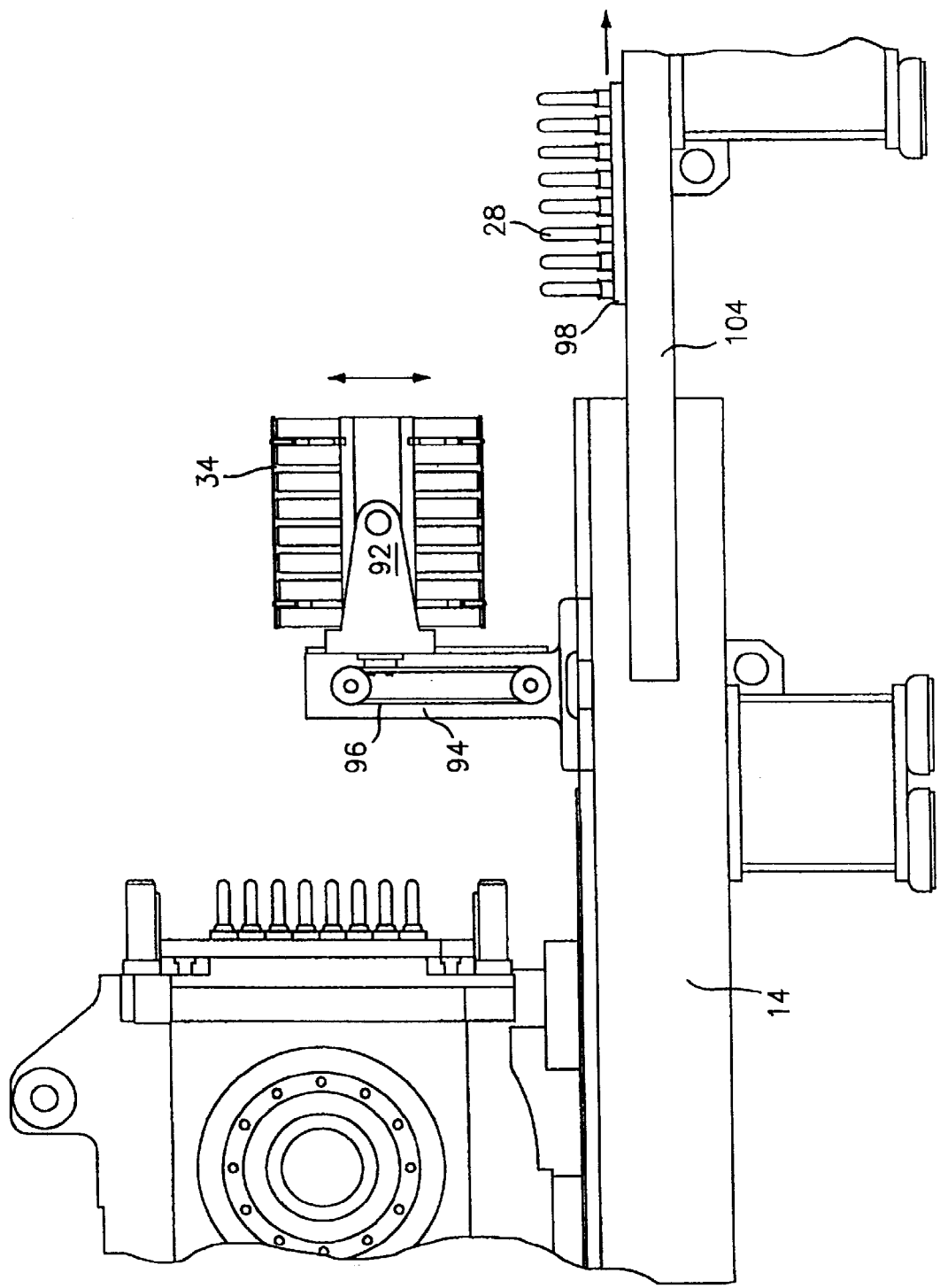

FIGS. 5–7 show yet another alternative embodiment of a cooling turret block in accordance with the present invention. In this embodiment, the cooling turret block 34 is provided with a vertical motion to allow it to accurately place finished parts onto a mandrel block 98 taking the parts to a downstream operation such as blow molding. Cooling turret block 34 has a journal 91 on each side. Each journal 91 is mounted in a sliding bearing block 92 that slides along a guide 93 on a respective carrier post 94 mounted to the base 14. Each bearing block 92 is moved along the guide 92 by a servo motor driven belt system 96.

The mandrel block 98, mounted on the track system of a downstream machine 100, is positioned underneath block 34 at some point in the molding cycle. FIG. 6 shows cooling turret block 34 moved downward to place a cooled set of molded parts 28 directly onto the individual mandrels 102 in block 98. The parts 28 can be pressed onto the mandrels 102 using the drive force developed by the servo belt drive system 96 to ensure an accurate and positive placement of the parts 28. FIG. 7 shows the cooling turret block 34 moving upward, leaving the parts 28 on the mandrels 102, and the mandrel block 98 exiting the area to proceed onto the operation of machine 100. The clear space provided in the base 14 allows the base 104 of the machine 100 to enter and be aligned and fastened to the base 14. This effectively couples the downstream machine 100 to the molding machine 10 and thereby provides a coupled molding operation between the two machines.

If desired, only one post 94 with one sliding block 92 and one drive system 96 may be used to move the cooling turret block up and down. In such a system, the turret block 34 need only be provided with a journal 91 on one side.

As can be seen from the foregoing description, the present invention has many advantages to it. Most notably, the cooling turret block of the present invention allows several sets of molded parts to be simultaneously processed and cooled. Further, the cooling turret block can be positioned relative to the index block so as not to interfere with the operation of the index block. Still further, the cooling turret block of the present invention allows the transfer of cooled parts to a downstream process.

The cooling turret block of the present invention can be used to load inserts onto molded parts if desired. The inserts can be loaded by incorporating an insert into each receiving tube. In this way, when the molded parts are received within the tubes, the inserts are loaded thereon.

While the stationary platen has been described as having a mold cavity plate attached to it, the stationary platen could have a mold core plate attached to it in lieu of the mold cavity plate. In such an instance, each of the two faces on the index turret block would have a mold cavity plate on it.

It is apparent that there has been provided in accordance with the present invention a turret cooling block for an index machine which fully satisfies the means, objects and advantages set forth hereinbefore. While the invention has been described in combination with specific embodiments thereof, it is evident that many alternatives, modifications, and variations will be apparent to those skilled in the art in light of the foregoing description. Accordingly, it is intended to encompass all such alternatives, modifications, and variations as fall within the spirit and broad scope of the appended claims.

What is claimed is:

1. A method for forming molded parts comprising the steps of:

providing an injection molding machine having a stationary platen having a first mold portion and an index turret block rotatable about a first axis, said first mold portion being at least one of a mold cavity plate and a mold core plate, said index turret block having two faces and each of said faces having a second mold portion comprising at least one of a mold cavity plate and a mold core plate, said index turret block being movable towards and away from said stationary platen;

providing a cooling turret block rotatable about a second axis substantially parallel to said first axis, said cooling turret block having a first face with means for directing a cooling fluid onto molded parts and second and third faces with means for receiving molded parts from said index turret block;

moving said index turret block towards said stationary platen until said first mold portion contacts said second mold portion and forms a plurality of mold cavities;

injecting molten material into each of said mold cavities and forming a first set of molded parts;

moving said index turret block away from said stationary platen;

rotating said index turret block about said first axis to move said first set of molded parts into a cooling position; and rotating said cooling turret block so that said first face with said cooling fluid directing means is directed toward said first set of molded parts and blowing said cooling fluid onto said first set of molded parts.

2. The method according to claim 1, further comprising forming a second set of molded parts while said first set of molded parts is being cooled by said cooling fluid directing means by moving said index turret block towards said stationary means until said first mold portion contacts said second mold portion and injecting molten material into said cavities.

3. The method according to claim 2, further comprising rotating said cooling turret block about said second axis to bring said receiving means on said second face into alignment with said first set of molded parts and ejecting said first set of molded parts from said index turret block into a first set of said receiving means.

4. The method according to claim 3, further comprising:
rotating said index turret block to move said second set of molded parts into said cooling position;
rotating said cooling turret block to bring said cooling fluid directing means on said first face into alignment with said second set of molded parts; and
blowing cooling fluid onto said second set of molded parts.

5. The method according to claim 4, further comprising moving said index turret block into a molding position and forming a third set of molded parts while said second set of molded parts is being cooled by said cooling fluid directing means.

6. The method according to claim 5, further comprising rotating said cooling turret block to align a second set of receiving means with said second set of molded parts and ejecting said second set of molded parts from said index turret block into said second set of receiving means.

7. The method according to claim 6, further comprising:
moving said index turret block away from said stationary platen;
rotating said index turret block to move said third set of molded parts to said cooling position; and
rotating said cooling turret block to bring said cooling fluid directing means into alignment with said third set of molded parts.

8. The method according to claim 7, further comprising moving said index turret block towards said stationary platen and forming a fourth set of molded parts while said third set of molded parts is being cooled.

9. The method according to claim 8, further comprising:
ejecting said molded parts from said first set of receiving means;
rotating said cooling turret block so that said first set of receiving means is aligned with said third set of molded parts; and
ejecting said third set of molded parts from said index turret block into said first set of receiving means.

10. The method according to claim 9, wherein each set of receiving means includes a plurality of inserts and said step of ejecting a respective set of said molded parts into a respective set of said receiving means comprises placing one of said inserts about each of said molded parts.

11. The method according to claim 1, further comprising moving said cooling turret block away from said index turret block a distance sufficient to allow said index turret block to rotate about said first axis.

12. The method according to claim 1, further comprising independently moving said cooling turret block towards and away from said stationary platen.

13. The method according to claim 1, further comprising moving said index turret block and said cooling turret block in unison towards and away from said stationary platen.

14. The method according to claim 9, further comprising raising and lowering said cooling turret block prior to said ejection of said first set of molded parts to allow said first set of molded parts to be accurately placed onto means for taking said first set of molded parts to a downstream operation.

15. A device for unloading and cooling molded parts from an injection molding machine having an index turret block rotatable about a central axis, said device comprising:
a cooling turret block rotatable about an axis substantially parallel to said central axis;
said cooling turret block having a plurality of faces;
a first face on said cooling turret including means for applying a cooling fluid to surfaces of said molded parts while said molded parts are resident on said index turret block; and
second and third faces on said cooling turret including means for receiving molded parts from said index turret block for further cooling.

16. The device according to claim 15, wherein said means for applying a cooling fluid comprises means for directing a stream of compressed air onto said molded parts.

17. The device according to claim 16, wherein said directing means directs said stream of compressed air onto an exposed gate area of each molded part.

18. The device according to claim 15, wherein said means for applying a cooling fluid comprises a plurality of nozzles for directing a stream of fluid onto exterior portions of said molded parts.

19. The device according to claim 15, wherein said means for receiving molded parts comprises a plurality of receiving tubes on each said second and third faces.

20. The device according to claim 19, wherein each of said receiving tubes includes means for cooling a molded part resident therein and vacuum means for retaining the molded part.

21. The device according to claim 19, wherein said index turret block has two mold core halves and each of said mold core halves has a plurality of mold cores and wherein the number of receiving tubes on each second and third face equals the number of mold cores on one of said mold core halves.

22. The device according to claim 15, wherein said cooling turret block has an even number of faces.

23. The device according to claim 22, wherein said cooling turret block has a fourth face which includes means for applying a cooling fluid.

24. The device according to claim 15, wherein said cooling turret block has six faces and has one pair of opposed faces including said first face equipped with said means for applying said cooling fluid and two pairs of opposed faces including said second and third faces forming one pair equipped with said means for receiving said molded parts.

25. The device according to claim 15, further comprising:
said index turret block being supported by a pair of carriers; and
said cooling turret block being supported by means attached to said carriers.

26. The device according to claim 25, wherein said means attached to said carriers includes:
a pair of supports attached to said carriers;
a guide affixed to each support;

a sliding block engaging each said guide; and a journal extending out from each side of said cooling turret block and engaging one of said sliding blocks.

27. The device according to claim 26, further comprising means attached to said cooling turret block for causing said cooling turret block to rotate.

28. The device according to claim 27, wherein said rotation causing means comprises a servo motor.

29. The device according to claim 25, further comprising means for causing said cooling turret block to move in an axial direction toward and away from said index turret block.

30. The device according to claim 15, further comprising:

carrier means for supporting said cooling turret block; and said carrier means being axially movable in said axial direction.

31. The device according to claim 30, further comprising said machine having a stationary platen and means for moving said carrier means towards and away from said stationary platen.

32. The device according to claim 31, wherein said moving means comprises a belt drive system.

33. The device according to claim 32, wherein said belt drive system comprises:

a pair of belts attached to said carrier means;

pulley means for engaging said belts;

a drive shaft connected to said pulley means; and a motor for rotating said drive shaft.

34. The device according to claim 33, wherein said motor for rotating said drive shaft and said drive shaft are positioned underneath said index turret block when said machine is in a mold closed position.

35. The device according to claim 31, further comprising means for rotating said cooling turret block about its rotational axis.

36. The device according to claim 15, further comprising means for raising and lowering said cooling turret block along an axis substantially perpendicular to its rotational axis so as to allow finished molded parts to be placed onto a means for taking said molded parts to a downstream operation.

37. The device according to claim 36, wherein said raising and lowering means comprises:

at least one post;

at least one sliding bearing block connected to said cooling turret block, said at least one sliding bearing block sliding along a guide affixed to said at least one post; and means for raising and lowering said at least one sliding bearing block.

38. The device according to claim 37, wherein said means for raising and lowering said at least one sliding bearing block comprises a belt driven system.

39. An injection molding machine comprising:

a base;

a stationary platen affixed to said base, said stationary platen having a first mold portion comprising at least one of a mold core plate and a mold cavity plate;

an index turret block having two faces, said index turret block being movable along a molding axis towards and away from said stationary platen and being rotatable about a first axis;

each of said index turret block faces having a second mold portion comprising at least one of a mold cavity plate and a mold core plate affixed thereto;

each of said second mold portions being movable between a first molding position where said second mold portion contacts said first mold portion and forms a plurality of mold cavities therewith and a second cooling position opposed to said first position;

means for injecting molten material into said cavities to form a plurality of molded parts;

a second turret block rotatable about a second axis substantially parallel to said first axis;

said second turret block being used to unload molded parts from said second mold portions when one of said second mold portions is in said second position; and said second turret block always being aligned with said index turret block along said molding axis.

40. The machine according to claim 39, further comprising:

said index turret block being supported by a pair of carriers; and said second turret block being supported by means attached to said carriers.

41. The machine according to claim 40, wherein said means attached to said carriers includes:

a pair of supports attached to said carriers;

a guide mounted to each said support;

a sliding block engaging each said guide; and a journal extending out from each side of said second turret block and engaging one of said sliding blocks.

42. The machine according to claim 41, further comprising:

at least one cylinder for causing said sliding blocks to move along said guides and thereby move said second turret block towards and away from said index turret block.

43. The machine according to claim 42, wherein said at least one cylinder spaces said second turret block from said index turret block a distance sufficient to allow said index turret block to rotate about said first axis.

44. The machine according to claim 39, further comprising means for rotating said second turret block about said second axis.

45. The machine according to claim 44, wherein said cooling turret block rotating means comprises a motor attached to said second turret block.

46. The machine according to claim 39, further comprising means for causing said second turret block to move along an axis substantially perpendicular to said second axis toward and away from said index turret block.

47. The machine according to claim 46, wherein said means for causing said second turret block to move along said axis comprises a pair of linear bearings on said base and a pair of carriers joined to said second turret block and slidable along said pair of linear bearings.

48. The machine according to claim 47, further comprising a belt drive system for causing said carriers to move along said linear bearings.

49. The machine according to claim 48, wherein said belt drive means comprises:

a drive belt attached to each said carrier;

pulley means for engaging each of said belts;

a drive shaft connected to said pulley means; and a drive motor for rotating said drive shaft.

50. The machine according to claim 49, wherein said drive motor and said drive shaft are positioned underneath said index turret block when said machine is in a mold closed position.

51. The machine according to claim 48, further comprising a rotational motor affixed to said second turret block via a gearbox.

52. The machine according to claim 39, further comprising means for raising and lowering said second turret block along an axis substantially perpendicular to said second axis so as to allow finished molded parts to be placed onto means for taking said molded parts to a downstream operation.

53. The machine according to claim 52, wherein said raising and lowering means comprises:

at least one post fixed to said base;

at least one guide affixed to said at least one post;

at least one sliding bearing block mounted to said second turret block and engaging said at least one guide; and means for raising and lowering said at least one sliding bearing block.

54. The machine according to claim 53, wherein said raising and lowering means comprises a belt driven system.

55. An injection molding machine comprising:

a base;

a stationary platen affixed to said base, said stationary platen having a first mold portion comprising at least one of a mold core plate and a mold cavity plate;

an index turret block having two faces, said index turret block being movable along said base towards and away from said stationary platen and being rotatable about a first axis;

each of said turret block faces having a second mold portion comprising at least one of a mold cavity plate and a mold core plate affixed thereto;

each of said second mold portions being movable between a first molding position where said second mold portion contacts said first mold portion and forms a plurality of mold cavities and a second cooling position opposed to said first position;

means for injecting molten material into said cavities to form a plurality of molded parts;

means for cooling said molded parts and unloading them when one of said second mold portions is in said second position, said cooling means comprising a second turret block rotatable about a second axis substantially parallel to said first axis; and said second turret block having a plurality of faces;

a first face on said second turret block having means for directing a cooling fluid onto said molded parts while said molded parts are resident on said second mold portion when one of said second mold portions is in said second position; and second and third faces on said second turret block having means for receiving molded parts from said second mold portions when one of said second mold portions is in said second position, said second and third faces being opposed.

56. The machine according to claim 55, wherein said second turret block has at least two opposed faces including said first face, each with said means for directing a cooling fluid onto said molded parts.

57. The machine according to claim 55, wherein said cooling fluid directing means comprises a plurality of nozzles on said first face for directing said cooling fluid onto gate areas of said molded parts.

58. The machine according to claim 55, wherein said receiving means comprises a plurality of receiving tubes on each of said two opposed faces.

59. The machine according to claim 58, wherein the number of receiving tubes on each of said two opposed faces is equal in number to said molded parts.

60. The machine according to claim 58, wherein each of said receiving tubes has means for cooling a molded part resident therein and vacuum means for retaining said molded part resident therein.

61. The machine according to claim 55, wherein said receiving means further comprises means for loading an insert onto said molded parts.

62. The machine according to claim 61, wherein said receiving means comprises a plurality of tubes for receiving said molded parts and wherein each of said tubes has an insert positioned therein which is placed on a respective one of said molded parts.

* * * * *

UNITED STATES PATENT AND TRADEMARK OFFICE
CERTIFICATE OF CORRECTION

PATENT NO. : 6,143,225
DATED : November 7, 2000
INVENTOR(S) : Domodossola et al.

It is certified that error appears in the above-identified patent and that said Letters Patent is hereby corrected as shown below:

<u>Column 12, claim 45,</u>
Line 42, "cooling" should read -- second --

Signed and Sealed this

Eighteenth Day of September, 2001

*Attest:*

NICHOLAS P. GODICI
*Attesting Officer*     *Acting Director of the United States Patent and Trademark Office*